United States Patent
Park et al.

(10) Patent No.: US 12,529,082 B2
(45) Date of Patent: Jan. 20, 2026

(54) O-PHOSPHOSERINE EXPORT PROTEIN VARIANT AND METHOD FOR PRODUCING O-PHOSPHOSERINE, CYSTEINE, AND DERIVATIVES THEREOF USING THE SAME

(71) Applicant: CJ CHEILJEDANG CORPORATION, Seoul (KR)

(72) Inventors: Hye Min Park, Seoul (KR); So-Yeon Kim, Seoul (KR); Hee-jin Sim, Seoul (KR); Jin Nam Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 157 days.

(21) Appl. No.: 17/756,527

(22) PCT Filed: Jun. 8, 2021

(86) PCT No.: PCT/KR2021/007172
§ 371 (c)(1),
(2) Date: May 26, 2022

(87) PCT Pub. No.: WO2021/251734
PCT Pub. Date: Dec. 16, 2021

(65) Prior Publication Data
US 2023/0127940 A1    Apr. 27, 2023

(30) Foreign Application Priority Data

Jun. 9, 2020 (KR) .................. 10-2020-0069753

(51) Int. Cl.
| | |
|---|---|
| *C12P 13/06* | (2006.01) |
| *C07K 14/245* | (2006.01) |
| *C12N 9/04* | (2006.01) |
| *C12N 9/10* | (2006.01) |
| *C12N 9/16* | (2006.01) |
| *C12N 15/52* | (2006.01) |
| *C12N 15/70* | (2006.01) |
| *C12P 13/12* | (2006.01) |

(52) U.S. Cl.
CPC ............ *C12P 13/06* (2013.01); *C07K 14/245* (2013.01); *C12N 9/0006* (2013.01); *C12N 9/1096* (2013.01); *C12N 9/16* (2013.01); *C12N 15/52* (2013.01); *C12N 15/70* (2013.01); *C12P 13/12* (2013.01); *C12Y 101/01095* (2013.01); *C12Y 206/01052* (2013.01); *C12Y 301/03003* (2013.01)

(58) Field of Classification Search
CPC ........ C12P 13/06; C12P 13/12; C07K 14/245; C12N 9/0006; C12N 9/1096; C12N 9/16; C12N 15/52; C12N 15/70; C12Y 101/01095; C12Y 206/01052; C12Y 301/03003; C12Y 205/01065
USPC .......................................................... 435/113
See application file for complete search history.

(56) References Cited

U.S. PATENT DOCUMENTS

| | | | |
|---|---|---|---|
| 5,972,663 A | 10/1999 | Winterhalter et al. | |
| 6,258,573 B1 | 7/2001 | Suga et al. | |
| 8,557,549 B2 | 10/2013 | Chang et al. | |
| 9,127,324 B2 | 9/2015 | Shin et al. | |
| 2003/0008358 A1 | 1/2003 | Suga et al. | |
| 2017/0247727 A1 | 8/2017 | Park et al. | |
| 2019/0233859 A1* | 8/2019 | Kim ........................ | C12P 13/06 |

FOREIGN PATENT DOCUMENTS

| | | |
|---|---|---|
| KR | 10-2014-0133754 A | 6/2016 |
| KR | 10-2016-0020050 A | 11/2016 |
| KR | 10-1694632 B1 | 1/2017 |

OTHER PUBLICATIONS

Sadowski MI, Jones DT. The sequence-structure relationship and protein function prediction. Curr Opin Struct Biol. Jun. 2009;19(3): 357-62. doi: 10.1016/j.sbi.2009.03.008. Epub May 4, 2009. PMID: 19406632. (Year: 2009).*
Seffernick JL, de Souza ML, Sadowsky MJ, Wackett LP. Melamine deaminase and atrazine chlorohydrolase: 98 percent identical but functionally different. J Bacteriol. Apr. 2001;183(8):2405-10. doi: 10.1128/JB.183.8.2405-2410.2001. PMID: 11274097; PMCID: PMC95154. (Year: 2001).*
Tang S, Edwards EA. Identification of Dehalobacter reductive dehalogenases that catalyse dechlorination of chloroform, 1,1,1-trichloroethane and 1,1-dichloroethane. Philos Trans R Soc Lond B Biol Sci. Mar. 11, 2013;368(1616):20120318. doi: 10.1098/rstb. 2012.0318. PMID: 23479748; PMCID: PMC3638459. (Year: 2013).*
Goude R. et al., Electroporation of Mycobacteria, Mycobacteria Protocols, Methods in Molecular Biology, 2009, v.465, p. 203-215, c.203.
Office Action in Russian Patent Application No. 2022114846 dated Dec. 15, 2023.
NCBI, GenBank Accession No. WP_001300943.1, 'Multispecies: MFS transporter [Proteobacteria]', Jun. 9, 2016.
Wada M and Takagi H , Appl. Microbiol. Biochem., 73:48-54, 2006.
Ahmed Zahoor, Computational and structural biotechnology journal, vol. 3, Oct. 2012.
Wendisch V F et al., Curr Opin Microbiol. Jun. 2006;9(3):268-74.
Peters-Wendisch P et al., Appl Environ Microbiol. Nov. 2005;71(11):7139-44.
Grant GA et al., J. Biol. Chem., 39: 5357-5361, 1999.
Grant GA et al., Biochem., 39: 7316-7319, 2000.
Grant GA et al., J. Biol. Chem., 276:17844-17850, 2001.
Peters-Wendisch P et al., Appl. Microbiol. BiotechnoL, 60:37-441, 2002.

* cited by examiner

Primary Examiner — Robert B Mondesi
(74) Attorney, Agent, or Firm — Knobbe, Martens, Olson & Bear, LLP

(57) ABSTRACT

An O-phosphoserine (OPS) export protein variant with increased O-phosphoserine exporting activity, and a method for producing O-phosphoserine, cysteine, and cysteine derivatives using the same. Also provided herein are O-phosphoserine-producing microorganisms, a polynucleotide encoding the O-phosphoserine export protein variant, and a vector containing the polynucleotide encoding the O-phosphoserine export protein variant.

12 Claims, No Drawings

Specification includes a Sequence Listing.

SEQUENCE LISTING

<160> NUMBER OF SEQ ID NOS: 30

<210> SEQ ID NO 1
<211> LENGTH: 405
<212> TYPE: PRT
<213> ORGANISM: Artificial Sequence
<220> FEATURE:
<223> OTHER INFORMATION: yhhS453

<400> SEQUENCE: 1

```
Met Pro Glu Pro Val Ala Glu Pro Ala Leu Asn Gly Leu Arg Leu Asn
1               5                   10                  15

Leu Arg Ile Val Ser Ile Val Met Phe Asn Phe Ala Ser Tyr Leu Thr
            20                  25                  30

Ile Gly Leu Pro Leu Ala Val Leu Pro Gly Tyr Val His Asp Val Met
        35                  40                  45

Gly Phe Ser Ala Phe Trp Ala Gly Leu Val Ile Ser Leu Gln Tyr Phe
    50                  55                  60

Ala Thr Leu Leu Ser Arg Pro His Ala Gly Arg Tyr Ala Asp Ser Leu
65                  70                  75                  80

Gly Pro Lys Lys Ile Val Val Phe Gly Leu Cys Gly Cys Phe Leu Ser
                85                  90                  95

Gly Leu Gly Tyr Leu Thr Ala Gly Leu Thr Ala Ser Leu Pro Val Ile
            100                 105                 110

Ser Leu Leu Leu Cys Leu Gly Arg Val Ile Leu Gly Ile Gly Gln
        115                 120                 125

Ser Phe Ala Gly Thr Gly Ser Thr Leu Trp Gly Val Gly Val Val Gly
    130                 135                 140

Ser Leu His Ile Gly Arg Val Ile Ser Trp Asn Gly Ile Val Thr Tyr
145                 150                 155                 160

Gly Ala Met Ala Met Gly Ala Pro Leu Gly Val Val Phe Tyr His Trp
                165                 170                 175

Gly Gly Leu Gln Ala Leu Ala Leu Ile Ile Met Gly Val Ala Leu Val
            180                 185                 190

Ala Ile Leu Leu Ala Ile Pro Arg Pro Thr Val Lys Ala Ser Lys Gly
        195                 200                 205

Lys Pro Leu Pro Phe Arg Ala Val Leu Gly Arg Val Trp Leu Tyr Gly
    210                 215                 220

Met Ala Leu Ala Leu Ala Ser Ala Gly Phe Gly Val Ile Ala Thr Phe
225                 230                 235                 240

Thr Thr Leu Phe Tyr Val Ala Lys Gly Trp Asp Gly Ala Ala Phe Ala
                245                 250                 255

Leu Thr Leu Phe Ser Cys Ala Phe Val Gly Thr Arg Leu Leu Phe Pro
            260                 265                 270

Asn Gly Ile Asn Arg Ile Gly Gly Leu Asn Val Ala Met Ile Cys Phe
        275                 280                 285

Ser Val Glu Ile Ile Gly Leu Leu Val Gly Val Ala Thr Met Pro
    290                 295                 300

Trp Met Ala Lys Ile Gly Val Leu Leu Ala Gly Ala Gly Phe Ser Leu
305                 310                 315                 320

Val Phe Pro Ala Leu Gly Val Val Ala Ile Lys Ala Val Pro Gln Gln
                325                 330                 335

Asn Gln Gly Ala Ala Leu Ala Thr Tyr Thr Val Phe Met Asp Leu Ser
            340                 345                 350
```

```
Leu Gly Val Thr Gly Pro Leu Ala Gly Leu Val Met Ser Trp Ala Gly
        355                 360                 365

Val Pro Val Ile Tyr Leu Ala Ala Ala Gly Leu Val Ala Ile Ala Leu
    370                 375                 380

Leu Leu Thr Trp Arg Leu Lys Lys Arg Pro Pro Glu His Val Pro Glu
385                 390                 395                 400

Ala Ala Ser Ser Ser
            405

<210> SEQ ID NO 2
<211> LENGTH: 1218
<212> TYPE: DNA
<213> ORGANISM: Artificial Sequence
<220> FEATURE:
<223> OTHER INFORMATION: yhhS453

<400> SEQUENCE: 2
atgcccgaac ccgtagccga acccgcgcta aacggattgc gcctgaattt gcgcattgtc     60
tctatagtca tgtttaactt cgccagctac ctcaccatcg ggttgccgct cgctgtatta    120
ccgggctatg tccatgatgt gatgggcttt agcgccttct gggcaggatt ggttatcagc    180
ctgcaatatt tcgccaccct gctgagccgc cctcatgccg acgttacgc cgattcgctg     240 ggacccaaaa agattgtcgt cttcggttta tgccggctgct ttttgagcgg tctggggtat    300
ctgacggcag gattaaccgc cagtctgcct gtcatcagcc tgttattact ttgcctgggg    360
cgcgtcatcc ttgggattgg gcaaagtttt gccggaacgg atcgaccct atggggcgtt     420 ggcgtggttg gctcgctgca tatcgggcgg gtgatttcgt ggaacggcat tgtcacttac    480
ggggcgatgg cgatgggtgc gccgttaggc gtcgtgtttt atcactgggg cggcttgcag    540
gcgttagcgt taatcattat gggcgtggcg ctggtggcca ttttgttggc gatcccgcgt    600
ccgacggtaa aagccagtaa aggcaaaccg ctgccgtttc gcgcggtgct ggggcgcgtc    660
tggctgtacg gtatggcgct ggcactggct tccgccggat ttggcgtcat cgccaccttt    720
accacgctgt tttatgtcgc taaaggttgg gacggtgcgg ctttcgcgct gacgctgttt    780
agctgtgcgt ttgtcggtac gcgtttgtta ttccctaacg gcattaaccg tatcggtggc    840
ttaaacgtag cgatgatttg ctttagcgtt gagataatcg gcctgctact ggttggcgtg    900
gcgactatgc cgtggatggc gaaaatcggc gtcttactgg cggggggccgg ttttcgctg     960 gtgttcccgg cattgggtgt agtggcgata aaagcggttc gcagcaaaa tcaggggcg     1020 gcgctggcaa cttacaccgt atttatggat ttatcgcttg gcgtgactgg accactggct   1080
gggctggtga tgagctgggc gggcgtaccg gtgatttatc tggcggcggc gggactggtc   1140
gcaatcgcgt tattactgac gtggcgatta aaaaaacggc ctccggaaca cgtccctgag   1200
gccgcctcat catcttaa                                                  1218

<210> SEQ ID NO 3
<211> LENGTH: 322
<212> TYPE: PRT
<213> ORGANISM: Artificial Sequence
<220> FEATURE:
<223> OTHER INFORMATION: serB

<400> SEQUENCE: 3

Met Pro Asn Ile Thr Trp Cys Asp Leu Pro Glu Asp Val Ser Leu Trp
1               5                   10                  15
```

```
Pro Gly Leu Pro Leu Ser Leu Ser Gly Asp Glu Val Met Pro Leu Asp
            20                  25                  30

Tyr His Ala Gly Arg Ser Gly Trp Leu Leu Tyr Arg Gly Leu Asp
            35                  40                  45

Lys Gln Arg Leu Thr Gln Tyr Gln Ser Lys Leu Gly Ala Ala Met Val
 50                  55                  60

Ile Val Ala Ala Trp Cys Val Glu Asp Tyr Gln Val Ile Arg Leu Ala
 65                  70                  75                  80

Gly Ser Leu Thr Ala Arg Ala Thr Arg Leu Ala His Glu Ala Gln Leu
                85                  90                  95

Asp Val Ala Pro Leu Gly Lys Ile Pro His Leu Arg Thr Pro Gly Leu
                100                 105                 110

Leu Val Met Asp Met Asp Ser Thr Ala Ile Gln Ile Glu Cys Ile Asp
                115                 120                 125

Glu Ile Ala Lys Leu Ala Gly Thr Gly Glu Met Val Ala Glu Val Thr
130                 135                 140

Glu Arg Ala Met Arg Gly Glu Leu Asp Phe Thr Ala Ser Leu Arg Ser
145                 150                 155                 160

Arg Val Ala Thr Leu Lys Gly Ala Asp Ala Asn Ile Leu Gln Gln Val
                165                 170                 175

Arg Glu Asn Leu Pro Leu Met Pro Gly Leu Thr Gln Leu Val Leu Lys
                180                 185                 190

Leu Glu Thr Leu Gly Trp Lys Val Ala Ile Ala Ser Gly Gly Phe Thr
                195                 200                 205

Phe Phe Ala Glu Tyr Leu Arg Asp Lys Leu Arg Leu Thr Ala Val Val
                210                 215                 220

Ala Asn Glu Leu Glu Ile Met Asp Gly Lys Phe Thr Gly Asn Val Ile
225                 230                 235                 240

Gly Asp Ile Val Asp Ala Gln Tyr Lys Ala Lys Thr Leu Thr Arg Leu
                245                 250                 255

Ala Gln Glu Tyr Glu Ile Pro Leu Ala Gln Thr Val Ala Ile Gly Asp
                260                 265                 270

Gly Ala Asn Asp Leu Pro Met Ile Lys Ala Ala Gly Leu Gly Ile Ala
                275                 280                 285

Tyr His Ala Lys Pro Lys Val Asn Glu Lys Ala Glu Val Thr Ile Arg
                290                 295                 300

His Ala Asp Leu Met Gly Val Phe Cys Ile Leu Ser Gly Ser Leu Asn
305                 310                 315                 320

Gln Lys

<210> SEQ ID NO 4
<211> LENGTH: 969
<212> TYPE: DNA
<213> ORGANISM: Artificial Sequence
<220> FEATURE:
<223> OTHER INFORMATION: serB

<400> SEQUENCE: 4
atgcctaaca ttacctggtg cgacctgcct gaagatgtct ctttatggcc gggtctgcct    60
ctttcattaa gtggtgatga agtgatgcca ctggattacc acgcaggtcg tagcggctgg   120
ctgctgtatg gtcgtgggct ggataaacaa cgtctgaccc aataccagag caaactgggt   180
gcggcgatgg tgattgttgc cgcctggtgc gtggaagatt atcaggtgat cgtctggca   240 ggttcactca ccgcacgggc tacacgcctg gcccacgaag cgcagctgga tgtcgccccg   300
```

```
ctggggaaaa tcccgcacct gcgcacgccg ggtttgctgg tgatggatat ggactccacc     360
gccatccaga ttgaatgtat tgatgaaatt gccaaactgg ccggaacggg cgagatggtg     420
gcggaagtaa ccgaacgggc gatgcgcggc gaactcgatt ttaccgccag cctgcgcagc     480
cgtgtggcga cgctgaaagg cgctgacgcc aatattctgc aacaggtgcg tgaaaatctg     540
ccgctgatgc aggcttaac gcaactggtg ctcaagctgg aaacgctggg ctggaaagtg     600
gcgattgcct ccggcggctt tactttcttt gctgaatacc tgcgcgacaa gctgcgcctg     660
accgccgtgg tagccaatga actggagatc atggacggta atttaccgg caatgtgatc     720 ggcgacatcg tagacgcgca gtacaaagcg aaaactctga ctcgcctcgc gcaggagtat     780
gaaatcccgc tggcgcagac cgtggcgatt ggcgatggag ccaatgacct gccgatgatc     840
aaagcggcag ggctggggat tgcctaccat gccaagccaa agtgaatga aaaggcggaa     900 gtcaccatcc gtcacgctga cctgatgggg gtattctgca tcctctcagg cagcctgaat     960
cagaagtaa                                                              969

<210> SEQ ID NO 5
<211> LENGTH: 410
<212> TYPE: PRT
<213> ORGANISM: Artificial Sequence
<220> FEATURE:
<223> OTHER INFORMATION: SerA wildtype

<400> SEQUENCE: 5

Met Ala Lys Val Ser Leu Glu Lys Asp Lys Ile Lys Phe Leu Leu Val
1               5                   10                  15

Glu Gly Val His Gln Lys Ala Leu Glu Ser Leu Arg Ala Ala Gly Tyr
                20                  25                  30

Thr Asn Ile Glu Phe His Lys Gly Ala Leu Asp Asp Glu Gln Leu Lys
            35                  40                  45

Glu Ser Ile Arg Asp Ala His Phe Ile Gly Leu Arg Ser Arg Thr His
        50                  55                  60

Leu Thr Glu Asp Val Ile Asn Ala Ala Glu Lys Leu Val Ala Ile Gly
65                  70                  75                  80

Cys Phe Cys Ile Gly Thr Asn Gln Val Asp Leu Asp Ala Ala Ala Lys
                85                  90                  95

Arg Gly Ile Pro Val Phe Asn Ala Pro Phe Ser Asn Thr Arg Ser Val
                100                 105                 110

Ala Glu Leu Val Ile Gly Glu Leu Leu Leu Leu Arg Gly Val Pro
            115                 120                 125

Glu Ala Asn Ala Lys Ala His Arg Gly Val Trp Asn Lys Leu Ala Ala
        130                 135                 140

Gly Ser Phe Glu Ala Arg Gly Lys Lys Leu Gly Ile Ile Gly Tyr Gly
145                 150                 155                 160

His Ile Gly Thr Gln Leu Gly Ile Leu Ala Glu Ser Leu Gly Met Tyr
                165                 170                 175

Val Tyr Phe Tyr Asp Ile Glu Asn Lys Leu Pro Leu Gly Asn Ala Thr
            180                 185                 190

Gln Val Gln His Leu Ser Asp Leu Leu Asn Met Ser Asp Val Val Ser
        195                 200                 205

Leu His Val Pro Glu Asn Pro Ser Thr Lys Asn Met Met Gly Ala Lys
    210                 215                 220

Glu Ile Ser Leu Met Lys Pro Gly Ser Leu Leu Ile Asn Ala Ser Arg
225                 230                 235                 240
```

```
Gly Thr Val Val Asp Ile Pro Ala Leu Cys Asp Ala Leu Ala Ser Lys
            245                 250                 255

His Leu Ala Gly Ala Ala Ile Asp Val Phe Pro Thr Glu Pro Ala Thr
        260                 265                 270

Asn Ser Asp Pro Phe Thr Ser Pro Leu Cys Glu Phe Asn Val Leu
    275                 280                 285

Leu Thr Pro His Ile Gly Gly Ser Thr Gln Glu Ala Gln Glu Asn Ile
290                 295                 300

Gly Leu Glu Val Ala Gly Lys Leu Ile Lys Tyr Ser Asp Asn Gly Ser
305                 310                 315                 320

Thr Leu Ser Ala Val Asn Phe Pro Glu Val Ser Leu Pro Leu His Gly
            325                 330                 335

Gly Arg Arg Leu Met His Ile His Glu Asn Arg Pro Gly Val Leu Thr
        340                 345                 350

Ala Leu Asn Lys Ile Phe Ala Glu Gln Gly Val Asn Ile Ala Ala Gln
    355                 360                 365

Tyr Leu Gln Thr Ser Ala Gln Met Gly Tyr Val Val Ile Asp Ile Glu
370                 375                 380

Ala Asp Glu Asp Val Ala Glu Lys Ala Leu Gln Ala Met Lys Ala Ile
385                 390                 395                 400

Pro Gly Thr Ile Arg Ala Arg Leu Leu Tyr
            405                 410

<210> SEQ ID NO 6
<211> LENGTH: 410
<212> TYPE: PRT
<213> ORGANISM: Artificial Sequence
<220> FEATURE:
<223> OTHER INFORMATION: SerA mutant type

<400> SEQUENCE: 6

Met Ala Lys Val Ser Leu Glu Lys Asp Lys Ile Lys Phe Leu Leu Val
1               5                   10                  15

Glu Gly Val His Gln Lys Ala Leu Glu Ser Leu Arg Ala Ala Gly Tyr
            20                  25                  30

Thr Asn Ile Glu Phe His Lys Gly Ala Leu Asp Asp Glu Gln Leu Lys
        35                  40                  45

Glu Ser Ile Arg Asp Ala His Phe Ile Gly Leu Arg Ser Arg Thr His
    50                  55                  60

Leu Thr Glu Asp Val Ile Asn Ala Ala Glu Lys Leu Val Ala Ile Gly
65                  70                  75                  80

Cys Phe Cys Ile Gly Thr Asn Gln Val Asp Leu Asp Ala Ala Ala Lys
                85                  90                  95

Arg Gly Ile Pro Val Phe Asn Ala Pro Phe Ser Asn Thr Arg Ser Val
            100                 105                 110

Ala Glu Leu Val Ile Gly Glu Leu Leu Leu Leu Leu Arg Gly Val Pro
        115                 120                 125

Glu Ala Asn Ala Lys Ala His Arg Gly Val Trp Asn Lys Leu Ala Ala
    130                 135                 140

Gly Ser Phe Glu Ala Arg Gly Lys Lys Leu Gly Ile Ile Gly Tyr Gly
145                 150                 155                 160

His Ile Gly Thr Gln Leu Gly Ile Leu Ala Glu Ser Leu Gly Met Tyr
                165                 170                 175

Val Tyr Phe Tyr Asp Ile Glu Asn Lys Leu Pro Leu Gly Asn Ala Thr
            180                 185                 190
```

```
Gln Val Gln His Leu Ser Asp Leu Leu Asn Met Ser Asp Val Val Ser
            195                 200                 205

Leu His Val Pro Glu Asn Pro Ser Thr Lys Asn Met Met Gly Ala Lys
    210                 215                 220

Glu Ile Ser Leu Met Lys Pro Gly Ser Leu Leu Ile Asn Ala Ser Arg
225                 230                 235                 240

Gly Thr Val Val Asp Ile Pro Ala Leu Cys Asp Ala Leu Ala Ser Lys
                245                 250                 255

His Leu Ala Gly Ala Ala Ile Asp Val Phe Pro Thr Glu Pro Ala Thr
            260                 265                 270

Asn Ser Asp Pro Phe Thr Ser Pro Leu Cys Glu Phe Asp Asn Val Leu
        275                 280                 285

Leu Thr Pro His Ile Gly Gly Ser Thr Gln Glu Ala Gln Glu Asn Ile
    290                 295                 300

Gly Leu Glu Val Ala Gly Lys Leu Ile Lys Tyr Ser Asp Asn Gly Ser
305                 310                 315                 320

Thr Leu Ser Ala Val Asn Phe Pro Glu Val Ser Leu Pro Leu His Val
                325                 330                 335

Gly Arg Arg Leu Met His Ile His Glu Asn Arg Pro Gly Val Leu Thr
            340                 345                 350

Ala Leu Asn Lys Ile Phe Ala Glu Gln Gly Val Asn Ile Ala Ala Gln
        355                 360                 365

Tyr Leu Gln Thr Ser Ala Gln Met Gly Tyr Val Val Ile Asp Ile Glu
    370                 375                 380

Ala Asp Glu Asp Val Ala Glu Lys Ala Leu Gln Ala Met Lys Ala Ile
385                 390                 395                 400

Pro Gly Thr Ile Arg Ala Arg Leu Leu Tyr
                405                 410

<210> SEQ ID NO 7
<211> LENGTH: 1233
<212> TYPE: DNA
<213> ORGANISM: Artificial Sequence
<220> FEATURE:
<223> OTHER INFORMATION: SerA wildtype

<400> SEQUENCE: 7
atggcaaagg tatcgctgga gaaagacaag attaagtttc tgctggtaga aggcgtgcac      60
caaaaggcgc tggaaagcct tcgtgcagct ggttacacca acatcgaatt tcacaaaggc     120
gcgctggatg atgaacaatt aaaagaatcc atccgcgatg cccacttcat cggcctgcga     180
tcccgtaccc atctgactga agacgtgatc aacgccgcag aaaaactggt cgctattggc     240
tgtttctgta tcggaacaaa ccaggttgat ctggatgcgg cggcaaagcg cgggatcccg     300
gtatttaacg caccgttctc aaatacgcgc tctgttgcgg agctggtgat ggcgaactg      360 ctgctgctat tgcgcggcgt gccggaagcc aatgctaaag cgcaccgtgg cgtgtggaac     420
aaactggcgg cgggttcttt tgaagcgcgc ggcaaaaagc tgggtatcat cggctacggt     480
catattggta cgcaattggg cattctggct gaatcgctgg gaatgtatgt ttactttat      540 gatattgaaa ataaactgcc gctgggcaac gccactcagg tacagcatct ttctgacctg     600
ctgaatatga gcgatgtggt gagtctgcat gtaccagaga atccgtccac caaaaatatg     660
atgggcgcga agaaatttc actaatgaag cccggctcgc tgctgattaa tgcttcgcgc     720
ggtactgtgg tggatattcc ggcgctgtgt gatgcgctgg cgagcaaaca tctggcgggg     780
```

```
gcggcaatcg acgtattccc gacggaaccg gcgaccaata gcgatccatt tacctctccg    840
ctgtgtgaat tcgacaacgt ccttctgacg ccacacattg gcggttcgac tcaggaagcg    900
caggagaata tcggcctgga agttgcgggt aaattgatca agtattctga caatggctca    960
acgctctctg cggtgaactt cccggaagtc tcgctgccac tgcacggtgg gcgtcgtctg    1020
atgcacatcc acgaaaaccg tccgggcgtg ctaactgcgc tgaacaaaat cttcgccgag    1080
cagggcgtca acatcgccgc gcaatatctg caaacttccg cccagatggg ttatgtggtt    1140
attgatattg aagccgacga agacgttgcc gaaaaagcgc tgcaggcaat gaaagctatt    1200
ccgggtacca ttcgcgcccg tctgctgtac taa                                 1233

<210> SEQ ID NO 8
<211> LENGTH: 1233
<212> TYPE: DNA
<213> ORGANISM: Artificial Sequence
<220> FEATURE:
<223> OTHER INFORMATION: SerA mutant type

<400> SEQUENCE: 8
atggcaaagg tatcgctgga gaaagacaag attaagtttc tgctggtaga aggcgtgcac    60
caaaaggcgc tggaaagcct tcgtgcagct ggttacacca acatcgaatt tcacaaaggc    120
gcgctggatg atgaacaatt aaaagaatcc atccgcgatg cccacttcat cggcctgcga    180
tcccgtaccc atctgactga agacgtgatc aacgccgcag aaaaactggt cgctattggc    240
tgtttctgta tcggaacaaa ccaggttgat ctggatgcgg cggcaaagcg cgggatcccg    300
gtatttaacg caccgttctc aaatacgcgc tctgttgcgg agctggtgat ggcgaactg    360 ctgctgctat tgcgcggcgt gccggaagcc aatgctaaag cgcaccgtgg cgtgtggaac    420
aaactggcgc gggttctttt tgaagcgcgc ggcaaaaagc tgggtatcat cggctacggt    480
catattggta cgcaattggg cattctggct gaatcgctgg gaatgtatgt ttacttttat    540
gatattgaaa ataaactgcc gctgggcaac gccactcagg tacagcatct ttctgacctg    600
ctgaatatga gcgatgtggt gagtctgcat gtaccagaga atccgtccac caaaaatatg    660
atgggcgcga agaaatttc actaatgaag cccggctcgc tgctgattaa tgcttcgcgc    720
ggtactgtgg tggatattcc ggcgctgtgt gatgcgctgg cgagcaaaca tctggcgggg    780
gcggcaatcg acgtattccc gacggaaccg gcgaccaata gcgatccatt tacctctccg    840
ctgtgtgaat tcgacaacgt ccttctgacg ccacacattg gcggttcgac tcaggaagcg    900
caggagaata tcggcctgga agttgcgggt aaattgatca agtattctga caatggctca    960
acgctctctg cggtgaactt cccggaagtc tcgctgccac tgcacgttgg gcgtcgtctg    1020
atgcacatcc acgaaaaccg tccgggcgtg ctaactgcgc tgaacaaaat cttcgccgag    1080
cagggcgtca acatcgccgc gcaatatctg caaacttccg cccagatggg ttatgtggtt    1140
attgatattg aagccgacga agacgttgcc gaaaaagcgc tgcaggcaat gaaagctatt    1200
ccgggtacca ttcgcgcccg tctgctgtac taa                                 1233

<210> SEQ ID NO 9
<211> LENGTH: 362
<212> TYPE: PRT
<213> ORGANISM: Artificial Sequence
<220> FEATURE:
<223> OTHER INFORMATION: SerC
```

<400> SEQUENCE: 9

```
Met Ala Gln Ile Phe Asn Phe Ser Ser Gly Pro Ala Met Leu Pro Ala
1               5                   10                  15
Glu Val Leu Lys Gln Ala Gln Gln Glu Leu Arg Asp Trp Asn Gly Leu
            20                  25                  30
Gly Thr Ser Val Met Glu Val Ser His Arg Gly Lys Glu Phe Ile Gln
        35                  40                  45
Val Ala Glu Glu Ala Glu Lys Asp Phe Arg Asp Leu Leu Asn Val Pro
50                  55                  60
Ser Asn Tyr Lys Val Leu Phe Cys His Gly Gly Gly Arg Gly Gln Phe
65                  70                  75                  80
Ala Ala Val Pro Leu Asn Ile Leu Gly Asp Lys Thr Thr Ala Asp Tyr
                85                  90                  95
Val Asp Ala Gly Tyr Trp Ala Ala Ser Ala Ile Lys Glu Ala Lys Lys
            100                 105                 110
Tyr Cys Thr Pro Asn Val Phe Asp Ala Lys Val Thr Val Asp Gly Leu
        115                 120                 125
Arg Ala Val Lys Pro Met Arg Glu Trp Gln Leu Ser Asp Asn Ala Ala
130                 135                 140
Tyr Met His Tyr Cys Pro Asn Glu Thr Ile Asp Gly Ile Ala Ile Asp
145                 150                 155                 160
Glu Thr Pro Asp Phe Gly Ala Asp Val Val Ala Ala Asp Phe Ser
                165                 170                 175
Ser Thr Ile Leu Ser Arg Pro Ile Asp Val Ser Arg Tyr Gly Val Ile
            180                 185                 190
Tyr Ala Gly Ala Gln Lys Asn Ile Gly Pro Ala Gly Leu Thr Ile Val
        195                 200                 205
Ile Val Arg Glu Asp Leu Leu Gly Lys Ala Asn Ile Ala Cys Pro Ser
210                 215                 220
Ile Leu Asp Tyr Ser Ile Leu Asn Asp Asn Gly Ser Met Phe Asn Thr
225                 230                 235                 240
Pro Pro Thr Phe Ala Trp Tyr Leu Ser Gly Leu Val Phe Lys Trp Leu
                245                 250                 255
Lys Ala Asn Gly Gly Val Ala Glu Met Asp Lys Ile Asn Gln Gln Lys
            260                 265                 270
Ala Glu Leu Leu Tyr Gly Val Ile Asp Asn Ser Asp Phe Tyr Arg Asn
        275                 280                 285
Asp Val Ala Lys Ala Asn Arg Ser Arg Met Asn Val Pro Phe Gln Leu
290                 295                 300
Ala Asp Ser Ala Leu Asp Lys Leu Phe Leu Glu Glu Ser Phe Ala Ala
305                 310                 315                 320
Gly Leu His Ala Leu Lys Gly His Arg Val Val Gly Gly Met Arg Ala
                325                 330                 335
Ser Ile Tyr Asn Ala Met Pro Leu Glu Gly Val Lys Ala Leu Thr Asp
            340                 345                 350
Phe Met Val Glu Phe Glu Arg Arg His Gly
        355                 360
```

<210> SEQ ID NO 10
<211> LENGTH: 1089
<212> TYPE: DNA
<213> ORGANISM: Artificial Sequence
<220> FEATURE:
<223> OTHER INFORMATION: SerC -continued

<400> SEQUENCE: 10

```
atggctcaaa tcttcaattt tagttctggt ccggcaatgc taccggcaga ggtgcttaaa      60
caggctcaac aggaactgcg cgactggaac ggtcttggta cgtcggtgat ggaagtgagt     120
caccgtggca aagagttcat tcaggttgca gaggaagccg agaaggattt tcgcgatctt     180
cttaatgtcc cctccaacta caaggtatta ttctgccatg gcggtggtcg cggtcagttt     240
gctgcggtac gctgaatat tctcggtgat aaaaccaccg cagattatgt tgatgccggt      300
tactgggcgg caagtgccat taagaagcg aaaaaatact gcacgcctaa tgtctttgac      360
gccaaagtga ctgttgatgg tctgcgcgcg gttaagccaa tcgtgaatg gcaactctct      420
gataatgctg cttatatgca ttattgcccg aatgaaacca tcgatggtat cgccatcgac     480
gaaacgccag acttcggcgc agatgtggtg gtcgccgctg acttctcttc aaccattctt     540
tcccgtccga ttgacgtcag ccgttatggt gtaatttacg ctggcgcgca gaaaaatatc     600
ggcccggctg gcctgacaat cgtcatcgtt cgtgaagatt tgctgggcaa agcgaatatc     660
gcgtgtccgt cgattctgga ttattccatc ctcaacgata acggctccat gtttaacacg     720
ccgccgacat ttgcctggta tctatctggt ctggtctta aatggctgaa agcgaacggc      780
ggtgtagctg aaatggataa aatcaatcag caaaaagcag aactgctata tggggtgatt     840
gataacagcg atttctaccg caatgacgtg gcgaaagcta accgttcgcg atgaacgtg      900
ccgttccagt tggcggacag tgcgcttgac aaattgttcc ttgaagagtc ttttgctgct     960
ggccttcatg cactgaaagg tcaccgtgtg gtcggcggaa tgcgcgcttc tatttataac    1020
gccatgccgc tggaaggcgt taaagcgctg acagacttca tggttgagtt cgaacgccgt    1080
cacggttaa                                                              1089
```

<210> SEQ ID NO 11
<211> LENGTH: 405
<212> TYPE: PRT
<213> ORGANISM: Artificial Sequence
<220> FEATURE:
<223> OTHER INFORMATION: yhhS MFS

<400> SEQUENCE: 11

```
Met Pro Glu Pro Val Ala Glu Pro Ala Leu Asn Gly Leu Arg Leu Asn
1               5                   10                  15

Leu Arg Ile Val Ser Ile Val Met Phe Asn Phe Ala Ser Tyr Leu Thr
            20                  25                  30

Ile Gly Leu Pro Leu Ala Val Leu Pro Gly Tyr Val His Asp Val Met
        35                  40                  45

Gly Phe Ser Ala Phe Trp Ala Gly Leu Val Ile Ser Leu Gln Tyr Phe
    50                  55                  60

Ala Thr Leu Leu Ser Arg Pro His Ala Gly Arg Tyr Ala Asp Ser Leu
65                  70                  75                  80

Gly Pro Lys Lys Ile Val Val Phe Gly Leu Cys Gly Cys Phe Leu Ser
                85                  90                  95

Gly Leu Gly Tyr Leu Thr Ala Gly Leu Thr Ala Ser Leu Pro Val Ile
            100                 105                 110

Ser Leu Leu Leu Leu Cys Leu Gly Arg Val Ile Leu Gly Ile Gly Gln
        115                 120                 125

Ser Phe Ala Gly Thr Gly Ser Thr Leu Trp Gly Val Gly Val Val Gly
    130                 135                 140
```

Ser Leu His Ile Gly Arg Val Ile Ser Trp Asn Gly Ile Val Thr Tyr
145                 150                 155                 160

Gly Ala Met Ala Met Gly Ala Pro Leu Gly Val Val Phe Tyr His Trp
                165                 170                 175

Gly Gly Leu Gln Ala Leu Ala Leu Ile Ile Met Gly Val Ala Leu Val
            180                 185                 190

Ala Ile Leu Leu Ala Ile Pro Arg Pro Thr Val Lys Ala Ser Lys Gly
        195                 200                 205

Lys Pro Leu Pro Phe Arg Ala Val Leu Gly Arg Val Trp Leu Tyr Gly
    210                 215                 220

Met Ala Leu Ala Leu Ala Ser Ala Gly Phe Gly Val Ile Ala Thr Phe
225                 230                 235                 240

Ile Thr Leu Phe Tyr Asp Ala Lys Gly Trp Asp Gly Ala Ala Phe Ala
                245                 250                 255

Leu Thr Leu Phe Ser Cys Ala Phe Val Gly Thr Arg Leu Leu Phe Pro
            260                 265                 270

Asn Gly Ile Asn Arg Ile Gly Gly Leu Asn Val Ala Met Ile Cys Phe
        275                 280                 285

Ser Val Glu Ile Ile Gly Leu Leu Leu Val Gly Val Ala Thr Met Pro
290                 295                 300

Trp Met Ala Lys Ile Gly Val Leu Leu Ala Gly Ala Gly Phe Ser Leu
305                 310                 315                 320

Val Phe Pro Ala Leu Gly Val Ala Val Lys Ala Val Pro Gln Gln
                325                 330                 335

Asn Gln Gly Ala Ala Leu Ala Thr Tyr Thr Val Phe Met Asp Leu Ser
            340                 345                 350

Leu Gly Val Thr Gly Pro Leu Ala Gly Leu Val Met Ser Trp Ala Gly
        355                 360                 365

Val Pro Val Ile Tyr Leu Ala Ala Ala Gly Leu Val Ala Ile Ala Leu
    370                 375                 380

Leu Leu Thr Trp Arg Leu Lys Lys Arg Pro Pro Glu His Val Pro Glu
385                 390                 395                 400

Ala Ala Ser Ser Ser
                405

<210> SEQ ID NO 12
<211> LENGTH: 1218
<212> TYPE: DNA
<213> ORGANISM: Artificial Sequence
<220> FEATURE:
<223> OTHER INFORMATION: yhhS

<400> SEQUENCE: 12
atgcccgaac ccgtagccga acccgcgcta acggattgc gcctgaattt gcgcattgtc      60
tctatagtca tgtttaactt cgccagctac ctcaccatcg ggttgccgct cgctgtatta     120
ccgggctatg tccatgatgt gatgggcttt agcgccttct gggcaggatt ggttatcagc     180
ctgcaatatt tcgccaccct gctgagccgc cctcatgccg acgttacgc cgattcgctg      240 ggacccaaaa agattgtcgt cttcggttta tgcggctgct ttttgagcgg tctgggtat     300 ctgacggcag gattaaccgc cagtctgcct gtcatcagcc tgttattact ttgcctgggg     360
cgcgtcatcc ttgggattgg gcaaagtttt gccggaacgg gatcgaccct atggggcgtt     420
ggcgtggttg gctcgctgca tatcgggcgg gtgatttcgt ggaacggcat tgtcacttac     480
ggggcgatgg cgatgggtgc gccgttaggc gtcgtgtttt atcactgggg cggcttgcag     540

```
gcgttagcgt taatcattat gggcgtggcg ctggtggcca ttttgttggc gatcccgcgt    600
ccgacggtaa aagccagtaa aggcaaaccg ctgccgtttc gcgcggtgct gggcgcgtc     660 tggctgtacg gtatggcgct ggcactggct tccgccggat ttggcgtcat cgccaccttt    720
atcacgctgt tttatgacgc taaaggttgg acggtgcgg ctttcgcgct gacgctgttt     780
agctgtgcgt tgtcggtac gcgtttgtta ttccctaacg gcattaaccg tatcggtggc     840
ttaaacgtag cgatgatttg ctttagcgtt gagataatcg gcctgctact ggttggcgtg    900
gcgactatgc cgtggatggc gaaaatcggc gtcttactgg cggggccgg gttttcgctg     960 gtgttcccgg cattgggtgt agtggcggta aaagcggttc cgcagcaaaa tcaggggcg    1020 gcgctggcaa cttacaccgt atttatggat ttatcgcttg gcgtgactgg accactggct   1080
gggctggtga tgagctgggc gggcgtaccg gtgatttatc tggcggcggc gggactggtc   1140
gcaatcgcgt tattactgac gtggcgatta aaaaacggc ctccggaaca cgtccctgag    1200
gccgcctcat catcttaa                                                1218
```

<210> SEQ ID NO 13
<211> LENGTH: 35
<212> TYPE: DNA
<213> ORGANISM: Artificial Sequence
<220> FEATURE:
<223> OTHER INFORMATION: pCL_PrhtB-yhhS library_F

<400> SEQUENCE: 13

```
caccgggagc ccgggatgcc cgaacccgta gccga                             35
```

<210> SEQ ID NO 14
<211> LENGTH: 35
<212> TYPE: DNA
<213> ORGANISM: Artificial Sequence
<220> FEATURE:
<223> OTHER INFORMATION: pCL_PrhtB-yhhS library_R

<400> SEQUENCE: 14

```
cttgcatgcc tgcagttaag atgatgaggc ggcct                             35
```

<210> SEQ ID NO 15
<211> LENGTH: 341
<212> TYPE: DNA
<213> ORGANISM: Artificial Sequence
<220> FEATURE:
<223> OTHER INFORMATION: rhtB promoter

<400> SEQUENCE: 15

```
cgatggtcga tgattaagac atcaaacccc aaatggaaca ggtcataggc cagttccgca    60
tattttacgt agctctcaat acgccccggg cagatgacta ccacccggtc atggtgctgt    120
gcgcgaaaac ggacaaagcg caccggaatg tcatccacac cagtaaactc tgcttcatca    180
cgctgacgcc agaaatcagt cagcggtccc atggtaaaag cagcaaacgc gttttctctt    240
gtttcccagt cttttttgctg ctgaaacatc gggtaatctg cctcttaaac cacgtaaaat    300 cgttttttttt agcgtgcctg acacaacgct gcgacagtag c                      341
```

<210> SEQ ID NO 16
<211> LENGTH: 35
<212> TYPE: DNA
<213> ORGANISM: Artificial Sequence
<220> FEATURE:
<223> OTHER INFORMATION: pCL_PrhtB_F

<400> SEQUENCE: 16
cggggatcct ctagacgctt gctgcaactc tctca        35

<210> SEQ ID NO 17
<211> LENGTH: 35
<212> TYPE: DNA
<213> ORGANISM: Artificial Sequence
<220> FEATURE:
<223> OTHER INFORMATION: pCL_PrhtB_R

<400> SEQUENCE: 17
tacgggttcg ggcatgatat ctttcctgtg tgaaa        35

<210> SEQ ID NO 18
<211> LENGTH: 35
<212> TYPE: DNA
<213> ORGANISM: Artificial Sequence
<220> FEATURE:
<223> OTHER INFORMATION: pCL_Prmf-serA*(G336V)-(RBS)serC_PrhtB-yhhS453_F

<400> SEQUENCE: 18
cacggttaaa agcttcgatg gtcgatgatt aagac        35

<210> SEQ ID NO 19
<211> LENGTH: 35
<212> TYPE: DNA
<213> ORGANISM: Artificial Sequence
<220> FEATURE:
<223> OTHER INFORMATION: pCL_Prmf-serA*(G336V)-(RBS)serC_PrhtB-yhhS453_R

<400> SEQUENCE: 19
gattacgcca agcttttaag atgatgaggc ggcct        35

<210> SEQ ID NO 20
<211> LENGTH: 35
<212> TYPE: DNA
<213> ORGANISM: Artificial Sequence
<220> FEATURE:
<223> OTHER INFORMATION: pSK-yhhS453_F

<400> SEQUENCE: 20
caggaattcg atatcatgcc cgaacccgta gccga        35

<210> SEQ ID NO 21
<211> LENGTH: 35
<212> TYPE: DNA
<213> ORGANISM: Artificial Sequence
<220> FEATURE:
<223> OTHER INFORMATION: pSK-yhhS453_R

<400> SEQUENCE: 21
gactagcgtg atatcttaag atgatgaggc ggcct        35

<210> SEQ ID NO 22
<211> LENGTH: 20
<212> TYPE: DNA
<213> ORGANISM: Artificial Sequence
<220> FEATURE:
<223> OTHER INFORMATION: yhhS-out-F

<400> SEQUENCE: 22
atgtgaatct gtggattatt        20

<210> SEQ ID NO 23
<211> LENGTH: 20

<212> TYPE: DNA
<213> ORGANISM: Artificial Sequence
<220> FEATURE:
<223> OTHER INFORMATION: yhhS-out-R

<400> SEQUENCE: 23
gttatggccg tttatcgaaa                                               20

<210> SEQ ID NO 24
<211> LENGTH: 35
<212> TYPE: DNA
<213> ORGANISM: Artificial Sequence
<220> FEATURE:
<223> OTHER INFORMATION: W3110 yhhSUP_F

<400> SEQUENCE: 24
caggaattcg atatctcgct ccggcgacat atgca                              35

<210> SEQ ID NO 25
<211> LENGTH: 35
<212> TYPE: DNA
<213> ORGANISM: Artificial Sequence
<220> FEATURE:
<223> OTHER INFORMATION: W3110 yhhSUP_R

<400> SEQUENCE: 25
cagcaagcgg gtaccgagga tcaccacatt tttac                              35

<210> SEQ ID NO 26
<211> LENGTH: 35
<212> TYPE: DNA
<213> ORGANISM: Artificial Sequence
<220> FEATURE:
<223> OTHER INFORMATION: pCL_Ptrc-gfp_F

<400> SEQUENCE: 26
aatgtggtga tcctcggtac ccgcttgctg caact                              35

<210> SEQ ID NO 27
<211> LENGTH: 35
<212> TYPE: DNA
<213> ORGANISM: Artificial Sequence
<220> FEATURE:
<223> OTHER INFORMATION: pCL_Ptrc-gfp_R

<400> SEQUENCE: 27
tacgggttcg ggcatgatat ctttcctgtg tgaaa                              35

<210> SEQ ID NO 28
<211> LENGTH: 35
<212> TYPE: DNA
<213> ORGANISM: Artificial Sequence
<220> FEATURE:
<223> OTHER INFORMATION: pCL_PrhtB-yhhS453_F

<400> SEQUENCE: 28
cacaggaaag atatcatgcc cgaacccgta gccga                              35

<210> SEQ ID NO 29
<211> LENGTH: 35
<212> TYPE: DNA
<213> ORGANISM: Artificial Sequence
<220> FEATURE:
<223> OTHER INFORMATION: pCL_PrhtB-yhhS453_R

<400> SEQUENCE: 29
gactagcgtg atatcgcacc catcgccatc gcccc                               35

<210> SEQ ID NO 30
<211> LENGTH: 4695
<212> TYPE: DNA
<213> ORGANISM: Artificial Sequence
<220> FEATURE:
<223> OTHER INFORMATION: pSKH130

<400> SEQUENCE: 30
tcgaggccgc gattaaattc caacatggat gctgatttat atgggtataa atgggctcgc      60
gataatgtcg ggcaatcagg tgcgacaatc tatcgattgt atgggaagcc cgatgcgcca     120
gagttgtttc tgaaacatgg caaaggtagc gttgccaatg atgttacaga tgagatggtc     180
agactaaact ggctgacgga atttatgcct cttccgacca tcaagcattt tatccgtact     240
cctgatgatg catggttact caccactgcg atccccggga aaacagcatt ccaggtatta     300
gaagaatatc ctgattcagg tgaaaatatt gttgatgcgc tggcagtgtt cctgcgccgg     360
ttgcattcga ttcctgtttg taattgtcct tttaacagcg atcgcgtatt tcgtctcgct     420
caggcgcaat cacgaatgaa taacggtttg gttgatgcga gtgattttga tgacgagcgt     480
aatggctggc ctgttgaaca gtctggaaaa gaaatgcata gcttttgcc attctcaccg      540 gattcagtcg tcactcatgg tgatttctca cttgataacc ttattttga cgaggggaaa      600 ttaataggtt gtattgatgt tggacgagtc ggaatcgcag accgatacca ggatcttgcc     660
atcctatgga actgcctcgg tgagttttct ccttcattac agaaacggct ttttcaaaaa     720
tatggtattg ataatcctga tatgaataaa ttgcagtttc atttgatgct cgatgagttt     780
ttctaatcag aattggttaa ttggttgtaa cactggcaga gcattacgct gacttgacgg     840
gacggcggct ttgttgaata atcgaacttt tgctgagtt gaaggatcag atcacgcatc      900
ttcccgacaa cgcagaccgt tccgtggcaa agcaaaagtt caaaatcacc aactggtcca     960
cctacaacaa agctctcatc aaccgtggct ccctcacttt ctggctggat gatggggcga    1020
ttcaggcctg gtatgagtca gcaacacctt cttcacgagg cagacctcag cgctcaaaga    1080 tgcagggta aaagctaacc gcatctttac cgacaaggca tccggcagtt caacagatcg     1140
ggaagggctg gatttgctga ggatgaaggt ggaggaaggt gatgtcattc tggtgaagaa    1200
gctcgaccgt cttggccgcg acaccgccga catgatccaa ctgataaaag agtttgatgc    1260
tcagggtgta gcggttcggt ttattgacga cgggatcagt accgacggtg atatgggca     1320 aatggtggtc accgcgcgta atacgactca ctatagggcg aattggagct ccaccgcggt    1380
ggcggccgct ctagacttta cggtatcgcc gctcccgatt cgcagcgcat cgccttctat    1440
cgccttcttg acgagttctt ctgagcggga ctctggggtt cgctagagga tcgatccttt    1500
ttaacccatc acatatacct gccgttcact attatttagt gaaatgagat attatgatat    1560
tttctgaatt gtgattaaaa aggcaacttt atgcccatgc aacagaaact ataaaaaata    1620
cagagaatga aagaaaacag atagattttt tagttcttta ggcccgtagt ctgcaaatcc    1680
ttttatgatt ttctatcaaa caaaagagga aaatagacca gttgcaatcc aaacgagagt    1740
ctaatagaat gaggtcgaaa agtaaatcgc gcgggtttgt tactgataaa gcaggcaaga    1800
cctaaaatgt gtaaagggca aagtgtatac tttggcgtca cccttacat attttaggtc     1860 tttttttatt gtgcgtaact aacttgccat cttcaaacag gagggctgga agaagcagac    1920

```
cgctaacaca gtacataaaa aaggagacat gaacgatgaa catcaaaaag tttgcaaaac    1980
aagcaacagt attaaccttt actaccgcac tgctggcagg aggcgcaact caagcgtttg    2040
cgaaagaaac gaaccaaaag ccatataagg aaacatacgg catttcccat attacacgcc    2100
atgatatgct gcaaatccct gaacagcaaa aaaatgaaaa atatcaagtt cctgaattcg    2160
attcgtccac aattaaaaat atctcttctg caaaaggcct ggacgtttgg gacagctggc    2220
cattacaaaa cgctgacggc actgtcgcaa actatcacgg ctaccacatc gtctttgcat    2280
tagccggaga tcctaaaaat gcggatgaca catcgattta catgttctat caaaaagtcg    2340
gcgaaacttc tattgacagc tggaaaaacg ctggccgcgt cttt aaagac agcgacaaat    2400 tcgatgcaaa tgattctatc ctaaaagacc aaacacaaga atggtcaggt tcagccacat    2460
ttacatctga cggaaaaatc cgtttattct cactgatttt ctccggtaaa cattacggca    2520
aacaaacact gacaactgca caagttaacg tatcagcatc agacagctct ttgaacatca    2580
acggtgtaga ggattataaa tcaatctttg acggtgacgg aaaaacgtat caaaatgtac    2640
agcagttcat cgatgaaggc aactacagct caggcgacaa ccatacgctg agagatcctc    2700
actacgtaga agataaaggc cacaaatact tagtatttga agcaaacact ggaactgaag    2760
atggctacca aggcgaagaa tctttatttta acaaagcata ctatggcaaa agcacatcat    2820
tcttccgtca agaaagtcaa aaacttctgc aaagcgataa aaaacgcacg gctgagttag    2880
caaacggcgc tctcggtatg attgagctaa acgatgatta cacactgaaa aaagtgatga    2940
aaccgctgat tgcatctaac acagtaacag atgaaattga acgcgcgaac gtcttt aaaa    3000 tgaacggcaa atggtacctg ttcactgact cccgcggatc aaaaatgacg attgacggca    3060
ttacgtctaa cgatatttac atgcttggtt atgtttctaa ttcttta act ggcccataca    3120 agccgctgaa caaaactggc cttgtgttaa aaatggatct tgatcctaac gatgtaacct    3180
ttacttactc acacttcgct gtacctcaag cgaaggaaa caatgtcgtg attacaagct    3240
atatgacaaa cagaggattc tacgcagaca acaatcaac gtttgcgcca agcttcctgc    3300
tgaacatcaa aggcaagaaa acatctgttg tcaaagacag catccttgaa caaggacaat    3360
taacagttaa caaataaaaa cgcaaaagaa aatgccgatg ggtaccgagc gaaatgaccg    3420
accaagcgac gcccaaccct ccatcggatc ccccgggctg caggaattcg atatcacgct    3480
agtcgaccta gctagcatat ggggagatct actagtaaag catgccaatt ggtattctat    3540
agtgtcacct aaatcgtatg tgtatgatac ataaggttat gtattaattg tagccgcgtt    3600
ctaacgacaa tatgtacaag cctaattgtg tagcatctgg cttactgaag cagaccctat    3660
catctctctc gtaaactgcc gtcagagtcg gtttggttgg acgaaccttc tgagtttctg    3720
gtaacgccgt cccgcacccg gaatggtca gcgaaccaat cagcagggtc atcgctagcc    3780
catggctaat tcccatgtca gccgttaagt gttcctgtgt cactcaaaat tgctttgaga    3840
ggctctaagg gcttctcagt gcgttacatc cctggcttgt tgtccacaac cgttaaacct    3900
taaaagcttt aaaagcctta tatattcttt tttttcttat aaaacttaaa accttagagg    3960
ctatttaagt tgctgattta tattaatttt attgttcaaa catgagagct tagtacgtga    4020
aacatgagag cttagtacgt tagccatgag agcttagtac gttagccatg agggtttagt    4080
tcgttaaaca tgagagctta gtacgttaaa catgagagct tagtacgtga aacatgagag    4140
cttagtacgt actatcaaca ggttgaactg ctgatcttca gatcctctac gccggacgca    4200
tcgtggccgg atcttgcggc cgcaaaaatt aaaaatgaag ttttaaatca atctaaagta    4260
tatatgagta aacttggtct gacagttacc aatgcttaat cagtgaggca ccaataactg    4320
```

-continued

```
ccttaaaaaa actagcgctg aggtctgcct cgtgaagaag gtgttgctga ctcataccag    4380
gcctgaatcg ccccatcatc cagccagaaa gtgagggagc cacggttgat gagagctttg    4440
ttgtaggtgg accagttggt gattttgaac ttttgctttg ccacggaacg gtctgcgttg    4500
tcgggaagat gcgtgatctg atccttcaac tcagcaaaag ttcgatttat tcaacaaagc    4560
cacgttgtgt ctcaaaatct ctgatgttac attgcacaag ataaaaatat atcatcatga    4620
acaataaaac tgtctgctta cataaacagt aatacaaggg gtgttatgag ccatattcaa    4680
cgggaaacgt cttgc                                                    4695
```

O-PHOSPHOSERINE EXPORT PROTEIN VARIANT AND METHOD FOR PRODUCING O-PHOSPHOSERINE, CYSTEINE, AND DERIVATIVES THEREOF USING THE SAME

CROSS-REFERENCE TO RELATED APPLICATIONS

This application is a U.S. National Phase Application of PCT International Application No. PCT/KR2021/007172, filed on Jun. 8, 2021, designating the United States of America, which is an International Application of and claims the benefit of priority to Korean Patent Application No. 10-2020-0069753, filed on Jun. 9, 2020, the entire contents of which are incorporated herein by reference.

REFERENCE TO SEQUENCE LISTING

The present application contains a Sequence Listing, which is being submitted via EFS Web on even date herewith. The Sequence Listing is submitted in a file entitled "Sequence_Listing_HAN030-015APC.txt," which was created on May 26, 2022, and is approximately 39,000 bytes in size. This Sequence Listing is hereby incorporated by reference.

BACKGROUND

Technical Field

The present application relates to an O-phosphoserine (OPS) export protein variant, and a method for producing O-phosphoserine, cysteine, and cysteine derivatives using the same.

Background Art

L-Cysteine, an amino acid having an important role in sulfur metabolism in all living organisms, is used not only in the synthesis of biological proteins such as hair keratin, glutathione, biotin, methionine, and other sulfur-containing metabolites, but also as a precursor for biosynthesis of coenzyme A.

Methods of producing L-cysteine using microorganisms known in the art include: 1) a method of biologically converting D,L-2-aminothiazoline-4-carboxylic acid (D,L-ATC) into L-cysteine using microorganisms, 2) a method of producing L-cysteine by direct fermentation using *E. coli* (U.S. Pat. No. 5,972,663 A; Wada M and Takagi H, *Appl. Microbiol. Biochem.*, 73:48-54, 2006), and 3) a method of producing O-phosphoserine (hereinafter, "OPS") by fermentation using microorganisms, and then converting O-phosphoserine into L-cysteine by reacting O-phosphoserine with a sulfide under the catalytic action of O-phosphoserine sulfhydrylase (hereinafter, "OPSS") (U.S. Pat. No. 8,557,549 B2).

In particular, in order to produce cysteine by way of method 3) in high yield, OPS, the precursor, should be produced in an excess amount.

Under such circumstances, the present inventors have made extensive efforts to discover an export factor that can smoothly export O-phosphoserine produced in an O-phosphoserine-producing microorganism from cells. In this regard, they have identified a variant in which the exporting activity is enhanced, and have confirmed that such a variant enhances OPS export, thereby completing the present application.

DETAILED DESCRIPTION OF THE INVENTION

Disclosure

Technical Problem

The present inventors completed the present application by identifying a variant with increased activity in the export factor capable of smoothly exporting the OPS produced in the OPS-producing strain out of the cell, and confirming that OPS export is improved due to the variant.

Technical Solution

It is one object of the present application to provide a polypeptide having O-phosphoserine (OPS) exporting activity.

It is another object of the present application to provide a polynucleotide encoding the polypeptide of the present application.

It is still another object of the present application to provide a vector containing the polynucleotide of the present application.

It is yet another object of the present application to provide an O-phosphoserine-producing microorganism, including any one or more of the polypeptide, the polynucleotide, and the vector of the present application.

It is even another object of the present application to provide a method for producing O-phosphoserine, including culturing the O-phosphoserine-producing microorganism of the present application in a medium.

It is further another object of the present application to provide a method for producing cysteine or a derivative thereof, including:
  a) producing O-phosphoserine (OPS) or a medium containing the same by culturing an O-phosphoserine-producing microorganism, which includes any one or more of the polypeptide, the polynucleotide encoding the polypeptide of the present application, and the vector containing the polynucleotide of the present application, in a medium; and
  b) reacting the O-phosphoserine or a medium containing the same produced in step a) with a sulfide in the presence of O-phosphoserine sulfhydrylase (OPSS) or a microorganism expressing the same.

Advantageous Effects

When the microorganism having an O-phosphoserine producing capability is cultured using the polypeptide having O-phosphoserine exporting activity of the present application, it can lead to high-yield production of OPS compared to using an existing non-modified or variant protein.

BEST MODE

The present application will be described in detail. Meanwhile, each description and embodiment disclosed herein can be applied to other descriptions and embodiments, respectively. That is, all combinations of various elements disclosed herein fall within the scope of the present application. Further, the scope of the present application is not limited by the specific description described below.

In one aspect of the present application to achieve the objects above, the present application provides a polypeptide having O-phosphoserine (OPS) exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K).

As used herein, the term "O-phosphoserine" (hereinafter, "OPS") refers to a phosphoric acid ester of serine which serves as a constituting component for many proteins. In particular, the OPS is a precursor of L-cysteine and can be converted to cysteine by reacting with a sulfide under the catalytic action of OPS sulfhydrylase (hereinafter, "OPSS"), but is not limited thereto (U.S. Pat. No. 8,557,549 B2).

As used herein, the term "a polypeptide having OPS exporting activity" refers to a membrane protein which has the activity of exporting OPS to the outside of the cell, and the membrane protein may be derived from E. coli. In the present application, the polypeptide having OPS exporting activity may be a YhhS major facilitator superfamily (MFS) transporter or a variant thereof. Specifically, the polypeptide of the present application may be a variant of the YhhS MFS transporter exhibiting improved activity compared to that of a wild-type YhhS MFS transporter, which has been identified as a protein having OPS exporting activity in E. coli, in which growth inhibition is released in a condition where excess OPS is present.

As used herein, the term "variant" refers to a protein having at least one amino acid sequence different from the recited sequence due to conservative substitution and/or modification such that functions and properties of the protein are retained. Variants differ from an identified sequence due to substitution, deletion, or addition of several amino acids. Such variants may generally be identified by modifying one of the above amino acid sequences of the protein and evaluating the properties of the modified protein. That is, the ability of the variants may be enhanced, unchanged, or diminished relative to a native protein. Further, some variants may include those in which one or more portions, such as an N-terminal leader sequence or transmembrane domain, have been removed. Other variants may include those in which a portion has been removed from the N- and/or C-terminus of a mature protein. The term "variant" may be used interchangeably with terms such as modified, modification, modified protein, modified polypeptide, mutant, mutein, divergent, variant, etc. without limitation, as long as the terms are used to indicate variation. For the purpose of the present application, the variant may be those having an increased activity of a modified protein compared to a natural wild-type or non-modified protein, but is not limited thereto.

As used herein, the term "conservative substitution" refers to substitution of an amino acid with another amino acid having similar structural and/or chemical properties. The variant may have, for example, at least one conservative substitution while retaining at least one biological activity. Such amino acid substitution may generally occur based on similarity of polarity, charge, solubility, hydrophobicity, hydrophilicity, and/or amphipathic nature of a residue. For example, among electrically charged amino acids, positively charged (basic) amino acids include arginine, lysine, and histidine, and negatively charged (acidic) amino acids include glutamic acid and aspartic acid; among uncharged amino acids, non-polar amino acids include glycine, alanine, valine, leucine, isoleucine, methionine, phenylalanine, tryptophan, and proline; polar or hydrophilic amino acids include serine, threonine, cysteine, tyrosine, asparagine, and glutamine; and aromatic amino acids among the amino acids include phenylalanine, tryptophan, and tyrosine.

Additionally, variants may also include deletion or addition of amino acids that have minimal influence on the properties and secondary structure of the polypeptide. For example, the polypeptide may be conjugated to a signal (or leader) sequence at the N-terminus of a protein involved in the transfer of proteins co-translationally or post-translationally. Further, the polypeptide may also be conjugated with another sequence or linker to identify, purify, or synthesize the polypeptide.

Specifically, the polypeptide having OPS exporting activity of the present application may be a polypeptide having OPS exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or a polypeptide having OPS exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K).

The polypeptide having OPS exporting activity of the present application may be a polypeptide having OPS exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or a polypeptide having OPS exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and consisting of or essentially consisting of an amino acid sequence, wherein b) the amino acid at a position corresponding to 88 is phenylalanine and c) the amino acid at a position corresponding to 207 is lysine (K).

Additionally, the polypeptide having OPS exporting activity of the present application may include without limitation any polypeptide having an amino acid sequence showing an identity of at least 70%, 80%, 90%, 95%, or 99% or higher, and less than 100% with the amino acid sequence of SEQ ID NO: 11 or SEQ ID NO: 1 and exhibiting an OPS exporting capability substantially identical or corresponding to that of the polypeptide, while being a polypeptide, which includes a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and has an amino acid sequence, wherein b) the amino acid at a position corresponding to 88 is phenylalanine and c) the amino acid at a position corresponding to 207 is lysine (K). Further, it is apparent that any polypeptide variant having an amino acid sequence, in which a part of the amino acid sequence is deleted, modified, substituted, or added at amino acid positions corresponding to 88, 207, 241, 246, and 330 of the amino acid sequence of SEQ ID NO: 11, may also fall within the scope of the present application, as long as it is a polypeptide having an amino acid sequence substantially having OPS exporting activity as a sequence having such identity.

Specifically, the polypeptide having OPS exporting activity of the present application may be a polypeptide having an amino acid sequence of SEQ ID NO: 1.

In the present application, the polypeptide having O-phosphoserine exporting activity having the amino acid sequence of SEQ ID NO: 1 may be a polypeptide having O-phosphoserine exporting activity including the amino acid sequence of SEQ ID NO: 1, a polypeptide having O-phosphoserine exporting activity represented by the amino acid sequence of SEQ ID NO: 1, a polypeptide having O-phosphoserine exporting activity consisting essentially of the amino acid sequence of SEQ ID NO: 1, or a polypeptide having O-phosphoserine exporting activity consisting of the amino acid sequence of SEQ ID NO: 1. Furthermore, the polypeptide having O-phosphoserine exporting activity of the present application does not exclude a meaningless sequence addition upstream or downstream of the amino acid sequence of SEQ ID NO: 1.

In the present application, the SEQ ID NO: 1 may mean an amino acid sequence having OPS exporting activity. Specifically, the SEQ ID NO: 1 may be an amino acid sequence constituting a variant of the YhhS MFS transporter, a protein that exhibits OPS exporting activity encoded by the yhhS gene.

The amino acid sequence of the YhhS MFS transporter, a protein that exhibits OPS exporting activity encoded by the yhhS gene, can be obtained from GenBank® of NCBI, a known database. The amino acid sequence of the YhhS MFS transporter may be, for example, SEQ ID NO: 11. Additionally, the amino acid sequence of the YhhS MFS transporter may be an amino acid sequence derived from *Escherichia coli* (*E. coli*), but is not limited thereto.

In another aspect of the present application, the present application provides a polynucleotide encoding the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1.

The SEQ ID NO: 11, SEQ ID NO: 1, O-phosphoserine, and polypeptide having O-phosphoserine exporting activity are the same as described above.

As used herein, the "polynucleotide", which is a polymer of nucleotides composed of nucleotide monomers connected in a lengthy chain by a covalently bond, is a DNA or RNA strand having at least a certain length.

The polynucleotide may include any polynucleotide encoding a polypeptide having OPS exporting activity of the present application without limitation. In the present application, the gene encoding the amino acid sequence of the OPS exporting protein may be the yhhS gene. Additionally, the gene may be derived from *Escherichia coli* (*E. coli*), but is not limited thereto.

Specifically, the polynucleotide encoding the polypeptide having OPS exporting activity of the present application may have or include a nucleotide sequence encoding the amino acid sequence represented by SEQ ID NO: 1. Additionally, the polynucleotide encoding the polypeptide having OPS exporting activity of the present application may consist of or consist essentially of a nucleotide sequence encoding the amino acid sequence represented by SEQ ID NO: 1. The polynucleotide of the present application may undergo various modifications in the coding region within the scope that does not change the amino acid sequence of the polypeptide, due to codon degeneracy or in consideration of the codons preferred in an organism in which the polypeptide is to be expressed. The polynucleotide of the present application may include or have, for example, a nucleotide sequence having homology or identity of at least 80%, 90%, 95%, or 99% or higher with the nucleotide sequence of SEQ ID NO: 2, but is not limited thereto. In one embodiment, the polynucleotide of the present application may consist of or consist essentially of a nucleotide sequence having homology or identity of at least 80%, 90%, 95%, or 99% or higher with the nucleotide sequence of SEQ ID NO: 2, but is not limited thereto.

Additionally, the polynucleotide of the present application may include a probe that may be prepared from a known gene sequence, for example, any sequence which can hybridize with a sequence complementary to all or part of the nucleotide sequence under stringent conditions to encode the amino acid sequence of SEQ ID NO: 1 without limitation. The "stringent conditions" refer to conditions under which specific hybridization between polynucleotides is allowed. Such conditions are specifically described in the literature (see J. Sambrook et al., *Molecular Cloning, A Laboratory Manual,* 2nd Edition, Cold Spring Harbor Laboratory press, Cold Spring Harbor, New York, 1989; F. M. Ausubel et al., *Current Protocols in Molecular Biology*, John Wiley & Sons, Inc., New York). For example, the stringent conditions may include conditions under which genes having a high homology or identity of 40% or higher, specifically 90% or higher, more specifically 95% or higher, much more specifically 97% or higher, and still much more specifically 99% or higher are hybridized with each other, and genes having homology or identity lower than the above homologies or identities are not hybridized with each other, or washing conditions of Southern hybridization, that is, washing once, specifically twice or three times at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS.

Hybridization requires that two nucleic acids contain complementary sequences, although mismatches between bases are possible depending on the stringency of the hybridization. The term "complementary" is used to describe the relationship between nucleotide bases that can hybridize with each other. For example, with respect to DNA, adenosine is complementary to thymine, and cytosine is complementary to guanine. Therefore, the polynucleotide of the present application may include isolated nucleotide fragments complementary to the entire sequence as well as nucleic acid sequences substantially similar thereto.

As used herein, the term "homology" or "identity" refers to a degree of relevance between two given amino acid sequences or nucleotide sequences, and may be expressed as a percentage. The terms homology and identity may often be used interchangeably with each other.

The sequence homology or identity of conserved polypeptide or polynucleotide sequences may be determined using standard alignment algorithms and can be used with a default gap penalty established by the program being used. Substantially, homologous or identical sequences are generally expected to hybridize to all or at least about 50%, 50%, 60%, 70%, 80%, or 90% of the entire length of the sequences under moderate or highly stringent conditions. Polynucleotides that contain degenerate codons instead of codons in hybridizing polynucleotides are also considered.

Whether any two polynucleotide sequences have homology, similarity, or identity may be, for example, determined by a known computer algorithm such as the "FASTA" program using default parameters (Pearson et al., (1988) *Proc. Natl. Acad. Sci. USA* 85:2444), Alternatively, it may be determined by the Needleman-Wunsch algorithm (Needleman and Wunsch, 1970, *J. Mol. Biol.* 48:443-453), which is performed using the Needleman program of the EMBOSS package (EMBOSS: The European Molecular Biology Open Software Suite, Rice et al., 2000, *Trends Genet.* 16:276-277) (version 5.0.0 or later) (GCG program package (Devereux, J., et al., *Nucleic Acids Research* 12:387 (1984)), BLASTP, BLASTN, FASTA (Atschul, S. F., et al., *J MOLEC BIOL* 215:403 (1990); *Guide to Huge Computers*, Martin J. Bishop, ed., Academic Press, San Diego, 1994, and CARILLO et al. (1988) *SIAM J Applied Math* 48:1073). For example, the homology, similarity, or identity may be determined using BLAST® or ClustalW of the National Center for Biotechnology Information (NCBI).

The homology, similarity, or identity of polypeptides or polynucleotides may be determined by comparing sequence information using, for example, the GAP computer program, such as Needleman et al. (1970), *J Mol Biol.* 48:443 as disclosed in Smith and Waterman, *Adv. Appl. Math* (1981) 2:482. In summary, the GAP program defines the homology, similarity, or identity as the value obtained by dividing the number of similarly aligned symbols (i.e., nucleotides or amino acids) by the total number of the symbols in the shorter of the two sequences. Default parameters for the GAP program may include (1) a unary comparison matrix (containing a value of 1 for identities and 0 for non-identities) and the weighted comparison matrix of Gribskov et al. (1986), *Nucl. Acids Res.* 14:6745, as disclosed in Schwartz and Dayhoff, eds., *Atlas of Protein Sequence and Structure*, National Biomedical Research Foundation, pp. 353-358 (1979) (or EDNAFULL substitution matrix (EMBOSS version of NCBI NUC4.4)); (2) a penalty of 3.0 for each gap and an additional 0.10 penalty for each symbol in each gap (or a gap opening penalty of 10 and a gap extension penalty of 0.5); and (3) no penalty for end gaps.

Further, whether any two polynucleotide or polypeptide sequences have homology, similarity, or identity with each other may be identified by comparing the sequences in a Southern hybridization experiment under stringent conditions as defined, and appropriate hybridization conditions defined are within the skill of the art, and may be determined by a method well known to those skilled in the art (for example, J. Sambrook et al.).

Specifically, the polynucleotides having homology or identity may be detected using the hybridization conditions including a hybridization step at a $T_m$ value of 55° C. under the above-described conditions. Further, the $T_m$ value may be 60° C., 63° C., or 65° C., but is not limited thereto, and may be appropriately adjusted by those skilled in the art depending on the purpose thereof.

The appropriate stringency for hybridizing polynucleotides depends on the length of the polynucleotides and the degree of complementation, and these variables are well known in the art (see Sambrook et al., supra, 9.50-9.51, 11.7-11.8).

In still another aspect of the present application, the present application provides a vector containing the polynucleotide encoding the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polynucleotide encoding the polypeptide having O-phosphoserine exporting activity having the amino acid sequence of SEQ ID NO: 1.

The SEQ ID NO: 11, SEQ ID NO: 1, O-phosphoserine, polypeptide having O-phosphoserine exporting activity, and polynucleotide are the same as described above.

As used herein, the term "vector" refers to a DNA construct containing the nucleotide sequence of a polynucleotide encoding the target polypeptide or protein operably linked to a suitable regulatory sequence so as to be able to express the target polypeptide or protein in a suitable host cell. The regulatory sequence may include a promoter capable of initiating transcription, any operator sequence for regulating the transcription, a sequence encoding a suitable mRNA ribosome binding site, and a sequence for regulating termination of transcription and translation. Once transformed into a suitable host cell, the vector may replicate or function independently from the host genome, or may integrate into the genome thereof.

The vector used in the present application is not particularly limited as long as it is able to replicate in the host cell, and any vector known in the art may be used. Examples of the vector conventionally used may include natural or recombinant plasmids, cosmids, viruses, and bacteriophages. For example, as a phage vector or cosmid vector, pWE15, M13, MBL3, MBL4, IXII, ASHII, APII, t10, t11, Charon4A, and Charon21A may be used; and as a plasmid vector, those based on pBR, pUC, pBluescriptII, pGEM, pTZ, pCL, pSK, pSKH, and pET may be used. Specifically, pCL, pSK, pSKH130, pDZ, pACYC177, pACYC184, pECCG117, pUC19, pBR322, pMW118, and pCC1BAC vectors may be used.

The insertion of the polynucleotide into the chromosome may be performed by any method known in the art, for example, by homologous recombination, but the method is not limited thereto.

The vector may further include a selection marker to confirm the insertion into the chromosome. The selection marker is for selecting the cells transformed with the vector, that is, for confirming whether the target nucleic acid molecule has been inserted, and markers that provide selectable phenotypes, such as drug resistance, auxotrophy, resistance to cell toxic agents, or expression of surface-modified proteins, may be used. Only cells expressing the selection marker are able to survive or to show different phenotypes under the environment treated with the selective agent, and thus the transformed cells may be selected.

As used herein, the term "transformation" refers to the introduction of a vector including a polynucleotide encoding a target polypeptide or protein into a host cell so that the polypeptide or protein encoded by the polynucleotide can be expressed in a host cell. As long as the transformed polynucleotide can be expressed in the host cell, it does not matter whether the transformed polynucleotide is integrated into the chromosome of the host cell and located therein or located extrachromosomally, and both cases can be included. Further, the polynucleotide may include DNA and RNA encoding the target polypeptide or protein.

The polynucleotide may be introduced in any form, as long as it can be introduced into the host cell and expressed therein. For example, the polynucleotide may be introduced into the host cell in the form of an expression cassette, which is a gene construct including all elements required for its autonomous expression. The expression cassette may commonly include a promoter operably linked to the polynucleotide, a transcription terminator, a ribosome binding site, or a translation terminator. The expression cassette may be in the form of a self-replicable expression vector. Additionally, the polynucleotide may be introduced into the host cell as it is and operably linked to sequences required for expression in the host cell, but is not limited thereto.

Additionally, as used herein, the term "operably linked" means that the gene sequence is functionally linked to a promoter sequence that initiates and mediates transcription of the polynucleotide encoding the target polypeptide or protein of the present application.

In yet another aspect of the present application, the present application provides an O-phosphoserine-producing microorganism, including any one or more of the polypeptide having O-phosphoserine (OPS) exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1, the polynucleotide encoding the polypeptide of the present application, and the vector containing the polynucleotide encoding the polypeptide of the present application.

The SEQ ID NO: 11, SEQ ID NO: 1, O-phosphoserine, polypeptide having O-phosphoserine exporting activity, polynucleotide, and vector are the same as described above.

As used herein, the term "an OPS-producing microorganism" refers to a microorganism that has a naturally weak OPS producing capability or a microorganism that has been given an OPS producing capability by natural or artificial genetic modification of a parent strain that does not have an OPS producing capability. Specifically, the microorganism may be a microorganism expressing a polypeptide having the amino acid sequence of SEQ ID NO: 1, but is not limited thereto. In the present application, the "OPS-producing microorganism" may be used interchangeably with "a microorganism having OPS producing capability", "OPS-producing strain", and "OPS-producing strain line".

For the purpose of the present application, in the case of the OPS-producing microorganism, the microorganism may include any one or more of the polypeptide having O-phosphoserine exporting activity of the present application, the polynucleotide encoding the polypeptide of the present application, and the vector containing the polynucleotide of the present application, thereby enhancing the activity of the polypeptide expressed therefrom, and thus, the production amount of OPS may be increased compared to that of a wild type or the microorganism before modification. This is significant in that the production of OPS can be increased by introducing the polypeptide having OPS exporting activity of the present application and enhancing its activity, while wild-type microorganisms cannot produce OPS or can only produce trace amounts even if they are able to produce OPS. That is, the OPS-producing microorganism of the present application may be one in which the activity of the polypeptide having OPS exporting activity of the present application is enhanced compared to its endogenous activity, but is not limited thereto.

As used herein, the term "enhancement compared to its endogenous activity" refers to an increased activity of a protein when compared to the activity of the protein possessed by a microorganism in its natural state.

As used herein, the term "to be expressed/being expressed" refers to a state in which a target polypeptide or protein is introduced into a microorganism or in which a target polypeptide or protein is modified to be expressed in the microorganism. When the target polypeptide or protein is a polypeptide or protein present in a microorganism, it may mean a state in which its activity is enhanced compared to the endogenous activity or activity before modification.

As used herein, the term "enhancement of activity" of a polypeptide or protein means that the activity of a polypeptide or protein is enhanced compared to its endogenous activity. As used herein, the term "endogenous activity" refers to the activity of a particular polypeptide or protein originally possessed by a parent strain before transformation or a non-modified microorganism, when a trait of a microorganism is altered due to genetic modification caused by a natural or artificial factor, and may be used interchangeably with "activity before modification". The "enhancement" or "increase" of the activity of a polypeptide or protein compared to its endogenous activity means that the activity is enhanced compared to the activity of a particular polypeptide or protein originally possessed by a parent strain before transformation or a non-modified microorganism.

The "increase of activity" may be achieved by introducing a foreign polypeptide or protein, or by enhancing the activity of an endogenous polypeptide or protein, but specifically, it may be achieved by enhancing the activity of an endogenous polypeptide or protein. Whether or not the activity of the polypeptide or protein is enhanced may be confirmed from an increase in the activity level, the expression level of the target polypeptide or protein, or the amount of the product exported from the target protein.

In the present application, the polypeptide or protein targeted for the enhancement of activity, that is, the target polypeptide or protein, may be a variant of the YhhS MFS transporter, and specifically, it may be a variant of the YhhS MFS transporter having OPS exporting activity which is enhanced compared to that of the wild-type YhhS MFS transporter, but is not limited thereto.

Additionally, in the present application, the product exported from the target polypeptide or protein may be O-phosphoserine, but is not limited thereto.

The enhancement of the activity of the polypeptide or protein may be achieved by various methods well known in the art, and may not be limited as long as the activity of the target polypeptide or protein can be enhanced compared to that of the microorganism before modification. The method may include genetic engineering or protein engineering, but is not limited thereto.

The method of enhancing the activity of a polypeptide or protein using the genetic engineering may be achieved, for example, by way of:

1) a method of increasing the intracellular copy number of a gene or polynucleotide encoding the polypeptide or protein;
2) a method of replacing the expression regulatory sequence of a gene encoding the polypeptide or protein on a chromosome with a sequence having a strong activity;
3) a method of modifying the nucleotide sequence of the initiation codon or 5'-UTR of the polypeptide or protein;
4) a method of modifying a polynucleotide sequence on a chromosome such that the activity of the polypeptide or protein is enhanced;
5) a method of introducing a foreign polynucleotide having the activity of the polypeptide or protein or a codon-optimized modified polynucleotide of the polynucleotide; or
6) a combination thereof, but is not limited thereto.

The method of enhancing the activity of a polypeptide or protein using the protein engineering may be achieved, for example, by analyzing the tertiary structure of the polypeptide or protein and selecting and modifying the exposed site, or chemically modifying the same, but is not limited thereto.

The 1) method of increasing the intracellular copy number of a gene encoding the polypeptide or protein may be performed by way of a method known in the art, for example, by introducing a vector, which is operably linked to the gene or polynucleotide encoding the polypeptide or protein and is able to replicate and function regardless of a host cell, into the host cell. Alternatively, the method may be performed by introducing a vector, which is able to insert the gene or polynucleotide into the chromosome of a host cell, to which the gene is operably linked, into the host cell, but is not limited thereto. The vector is the same as described above.

The 2) method of replacing the expression regulatory sequence of a gene encoding the polypeptide or protein on a chromosome with a sequence having a strong activity may be performed by way of a method known in the art, for example, by inducing a modification on the sequence through deletion, insertion, non-conservative or conservative substitution of the nucleic acid sequence, or a combination thereof to further enhance the activity of the expression regulatory sequence, or by replacing the polynucleotide sequence with a nucleic acid sequence having a stronger activity. The expression regulatory sequence may include, but is not particularly limited to, a promoter, an operator sequence, a sequence encoding a ribosome binding site, and a sequence regulating the termination of transcription and translation. Specifically, the method may include linking a strong heterologous promoter, instead of the original promoter, but is not limited thereto.

Examples of the strong promoter may include CJ7 promoter (U.S. Pat. No. 7,662,943 B2), CJ1 promoter (U.S. Pat. No. 7,662,943 B2), lac promoter, trp promoter, trc promoter, tac promoter, lambda phage PR promoter, PL promoter, and tet promoter, but is not limited thereto.

The 3) method of modifying the nucleotide sequence of the initiation codon or 5'-UTR of the polypeptide or protein may be performed by way of a method known in the art, for example, by substituting the endogenous initiation codon of the polypeptide or protein with another initiation codon having a higher expression rate of the polypeptide or protein compared to the endogenous initiation codon, but is not limited thereto.

The 4) method of modifying a polynucleotide sequence on a chromosome such that the activity of the polypeptide or protein is enhanced may be performed by way of a method known in the art, for example, by inducing a modification on the expression regulatory sequence through deletion, insertion, non-conservative or conservative substitution of the nucleotide sequence, or a combination thereof to further enhance the activity of the polynucleotide sequence, or by replacing the polynucleotide sequence with a polynucleotide sequence modified to have a stronger activity. The replacement may specifically be achieved by inserting the gene into the chromosome by homologous recombination, but is not limited thereto.

The vector used herein may further include a selection marker to confirm the insertion into the chromosome. The selection marker is the same as described above.

The 5) method of introducing a foreign polynucleotide having the activity of the polypeptide or protein may be performed by way of a method known in the art, for example, by introducing into a host cell a foreign polynucleotide encoding a polypeptide or protein that exhibits the same or similar activity to the polypeptide or protein or a codon-optimized modified polynucleotide thereof. The foreign polynucleotide may be used without limitation regardless of its origin or sequence as long as it exhibits the same or similar activity to the polypeptide or protein. Additionally, for the optimized transcription and translation of the foreign polynucleotide in a host cell, its codon may be optimized and introduced into the host cell. The introduction may be performed by one of ordinary skill in the art by selecting a suitable transformation method known in the art, and the expression of the introduced polynucleotide in the host cell enables production of the polypeptide or protein, thereby increasing its activity.

Lastly, the 6) combination of the methods above may be performed by applying any one or more of methods of 1) to 5) in combination.

Such enhancement of the activity of the polypeptide or protein activity may be an increase in the activity or concentration of the target polypeptide or protein based on the activity or concentration of the polypeptide or protein expressed in a wild-type or microbial strain before modification, or may be an increase in the amount of product produced from the target polypeptide or protein, but is not limited thereto. As used herein, the term "strain before modification" or "microorganism before modification" does not exclude strains containing mutations that may occur naturally in microorganisms, and it may refer to a natural strain itself or a strain before modification in which a trait is altered due to a genetic mutation caused by natural or artificial factors. The "strain before modification" or "microorganism before modification" may be used interchangeably with "non-mutated strain", "non-modified strain", "non-mutated microorganism", "non-modified microorganism", or "platform microorganism".

In the present application, the platform microorganism may be CA07-0012, a known microorganism producing OPS, CA07-0022/pCL_Prmf-serA*(G336V)-serC (KCCM11103P (U.S. Pat. No. 8,557,549 B2), a strain in which the activities of the endogenous SerA (D-3-phosphoglycerate dehydrogenase) and SerC (3-phosphoserine aminotransferase) are enhanced, and CA07-0012 (KCCM11121P, U.S. Pat. No. 8,557,549 B2), or a strain in which the activity of endogenous phosphoserine phosphatase (SerB) is weakened, but is not limited thereto.

The microorganism of the present application may be a recombinant microorganism produced by transforming with a vector containing a polynucleotide encoding the polypeptide, but is not limited thereto.

The microorganism of the present application is not limited by its type as long as it can produce OPS, and may be any prokaryotic or eukaryotic microorganism, specifically a prokaryotic microorganism. The prokaryotic microorganism may include microbial strains belonging to the genus *Escherichia*, the genus *Erwinia*, the genus *Serratia*, the genus *Providencia*, the genus *Corynebacterium*, and the genus *Brevibacterium*, specifically a microorganism belonging to the genus *Escherichia*, and more specifically *Escherichia coli*, but is not limited thereto. In particular, in the case of the microorganism belonging to the genus *Escherichia*, OPS and L-serine can be produced through SerA, SerC, and SerB, which are enzymes of the biosynthetic pathway of L-serine (Ahmed Zahoor, *Computational and structural biotechnology journal*, Vol. 3, 2012 October; Wendisch V. F. et al., *Curr Opin Microbiol.* 2006 June; 9 (3): 268-74; Peters-Wendisch P. et al., *Appl Environ Microbiol.* 2005 November; 71 (11): 7139-44).

The OPS-producing microorganism of the present application may be one in which the activity of phosphoserine phosphatase (SerB) may be further weakened compared to its endogenous activity.

The SerB of the present application has an activity of converting OPS to L-serine, and thus the microorganism modified to weaken the SerB activity has the property of accumulating OPS therein, and is thus useful for the production of OPS. The SerB of the present application may be a protein having or including an amino acid sequence represented by SEQ ID NO: 3, or may be a protein consisting of or consisting essentially of an amino acid sequence represented by SEQ ID NO: 3, but is not limited thereto. Additionally, the SerB may have or include an amino acid sequence having a sequence homology or identity of 80%, 90%, 95%, or 99% or higher to the amino acid sequence represented by SEQ ID NO: 3, as long as it shows the SerB activity. Moreover, the SerB of the present application may consist of or consist essentially of an amino acid sequence having homology or identity of 80%, 90%, 95%, or 99% or higher to the amino acid sequence represented by SEQ ID NO: 3, but is not limited thereto. In addition, the polynucleotide encoding the SerB may have or include a nucleotide sequence encoding the amino acid sequence represented by SEQ ID NO: 3. Further, the polynucleotide encoding the SerB may consist of or consist essentially of a nucleotide sequence encoding the amino acid sequence represented by SEQ ID NO: 3. The polynucleotide encoding SerB of the present application may undergo various modifications in the coding region within the scope that does not change the amino acid sequence of the SerB protein, due to codon degeneracy or in consideration of the codons preferred in an organism in which the SerB protein is to be expressed. The polynucleotide encoding SerB of the present application may have or include a nucleotide sequence having homology or identity of 80%, 90%, 95%, or 99% or higher, and less than 100% to the nucleotide sequence of SEQ ID NO: 4. Additionally, the polynucleotide encoding SerB of the present application may consist of or consist essentially of a nucleotide sequence having homology or identity of 80%, 90%, 95%, or 99% or higher, and less than 100% to the nucleotide sequence of SEQ ID NO: 4, but is not limited thereto.

As used herein, the term "weakening of activity compared to its endogenous activity" means that a natural wild-type strain, a parent strain, or the target protein have no expression of the enzyme or protein, or have no activity or decreased activity even when expressed, as compared to a non-modified strain. In particular, the decrease is a comprehensive concept including the case where the protein activity is decreased compared to the activity of the protein originally possessed by a microorganism due to a mutation of the gene encoding the protein, modification of the expression regulatory sequence, or deletion in a part or all of genes, etc.; the case where the overall level of intracellular protein activity is decreased compared to that of a natural strain or a strain before modification due to the inhibition of expression of the gene encoding the protein or the inhibition of translation; and a combination thereof.

The weakening of the protein activity may be achieved by way of various methods well known in the art. Examples of the methods may include: a method for modifying the gene sequence encoding the protein such that the protein activity is removed or weakened; a method for modifying the expression regulatory sequence such that the expression of the gene is decreased; a method for deleting a part or all of the gene encoding the protein; a method of introducing an antisense oligonucleotide (e.g., antisense RNA), which inhibits the translation from the mRNA into a protein via a complementary binding to the transcript of the gene on the chromosome; a method of making the attachment of a ribosome impossible by forming a secondary structure by artificially adding a complementary sequence to the Shine-Dalgarno (SD) sequence on the front end of the SD sequence of the gene encoding the protein; and a reverse transcription engineering (RTE) method, which adds a promoter so as to be reversely transcribed on the 3' terminus of the open reading frame (ORF) of the polynucleotide sequence of the gene encoding the protein; and a combination thereof, but are not particularly limited thereto.

Specifically, the method of modifying the gene sequence on the chromosome may be performed by inducing a modification in the sequence via deletion, insertion, non-conservative substitution, conservative substitution, or a combination thereof so as to further weaken the activity of the protein; or by replacing the sequence with a gene sequence modified to have a weaker activity or a gene sequence modified to have no activity at all.

The method of modifying the expression regulatory sequence may be performed by inducing a modification in the expression regulatory sequence via deletion, insertion, conservative substitution, non-conservative substitution, or a combination thereof so as to further weaken the activity of the expression regulatory sequence; or by replacing the sequence with a nucleic acid sequence having a weaker activity. The expression regulatory sequence may include a promoter, an operator sequence, a sequence encoding a ribosome binding site, and a sequence for regulating transcription and translation.

The method of deleting a part or the entirety of a gene encoding the protein may be performed by replacing the polynucleotide encoding the endogenous target protein within the chromosome with a polynucleotide or a marker gene having a partially deleted nucleic acid sequence using a vector for chromosomal insertion into bacteria. For example, a method of deleting a gene by way of homologous recombination may be used. Additionally, as used herein, the term "part", although it may vary depending on the kinds of polynucleotide, may specifically refer to 1 to 300 nucleotides, more specifically 1 to 100 nucleotides, and even more specifically 1 to 50 nucleotides, but is not particularly limited thereto.

In addition, the method of modifying the expression regulatory sequence may be performed by inducing a modification in the expression regulatory sequence via deletion, insertion, conservative substitution, non-conservative substitution, or a combination thereof so as to further weaken the activity of the expression regulatory sequence; or by replacing the sequence with a nucleic acid sequence having a weaker activity. The expression regulatory sequence may include a promoter, an operator sequence, a sequence encoding a ribosome binding site, and a sequence for regulating transcription and translation.

Further, the method of modifying the gene sequence on the chromosome may be performed by inducing a modification in the sequence via deletion, insertion, conservative substitution, non-conservative substitution, or a combination thereof so as to further weaken the activity of the protein; or by replacing the sequence with a gene sequence modified to have a weaker activity or a gene sequence modified to have no activity at all.

Additionally, the OPS-producing microorganism of the present application may be one in which the activity of phosphoglycerate dehydrogenase (SerA) or phosphoserine aminotransferase (SerC) is further enhanced compared to its endogenous activity.

The SerA is a protein capable of converting 3-phosphoglycerate into 3-phospho-hydroxypyruvate. The SerC is a protein capable of converting 3-phospho-hydroxypyruvate into OPS. Accordingly, any microorganism with enhanced SerA and/or SerC activities may be effectively used as an OPS-producing microorganism.

The SerA may be a protein having or including an amino acid sequence represented by SEQ ID NO: 5 or 6, or a protein consisting of or consisting essentially of an amino acid sequence represented by SEQ ID NO: 5 or 6, although it is not limited thereto. The amino acid sequence represented by SEQ ID NO: 5 is a sequence of the wild-type SerA, and the amino acid sequence represented by SEQ ID NO: 6 is a sequence of a SerA variant where the feedback inhibition on serine is released. Additionally, the SerA of the present application may have or include an amino acid sequence having homology or identity of at least 80%, 90%, 95%, or 99% or higher, and less than 100% with the amino acid sequence represented by SEQ ID NO: 5 or 6, as long as it shows the activity of the wild-type SerA or the activity of the SerA variant in which the feedback inhibition on serine is released, but is not limited thereto. Moreover, the SerA of the present application may consist of or consist essentially of an amino acid sequence having homology or identity of at least 80%, 90%, 95%, or 99% or higher, and less than 100% with the amino acid sequence represented by SEQ ID NO: 5 or 6, as long as it shows the activity of the wild-type SerA or the activity of the SerA variant in which the feedback inhibition on serine is released. The SerA variants in which the feedback inhibition on serine is released refer to those proteins in which a modification is introduced on the SerA-encoding gene by inserting a nucleotide of the gene encoding SerA or substituting the gene encoding the wild-type SerA, etc., thereby maintaining the activity from the feedback inhibition by serine or glycine, or having enhanced activities thereof, and those variants where the feedback inhibition on serine is released are already well known (Grant G. A. et al., *J. Biol. Chem.*, 39:5357-5361, 1999; Grant G. A. et al., *Biochem.*, 39:7316-7319, 2000; Grant G. A. et al., *J. Biol. Chem.*, 276:17844-17850, 2001; Peters-Wendisch P. et al., *Appl. Microbiol. Biotechnol.*, 60:37-441, 2002; U.S. Pat. No. 6,258,573 B1).

Additionally, the polynucleotide sequence encoding the wild-type SerA or the SerA variant where the feedback inhibition on serine is released may have or include a nucleotide sequence encoding any one amino acid sequence represented by SEQ ID NO: 5 or 6. Further, the polynucleotide sequence encoding the wild-type SerA or the SerA variant where the feedback inhibition on serine is released may consist of or consist essentially of a nucleotide sequence encoding any one amino acid sequence represented by SEQ ID NO: 5 or SEQ ID NO: 6, but is not limited thereto. The polynucleotide sequence encoding the wild-type SerA or the SerA variant where the feedback inhibition on serine is released may undergo various modifications in the coding region within the scope that does not change the amino acid sequence of the polypeptide encoding the wild-type SerA or the SerA variant where the feedback inhibition on serine is released, due to codon degeneracy or in consideration of the codons preferred in an organism in which the polypeptide is to be expressed. For example, the nucleotide sequence encoding the amino acid sequence represented by SEQ ID NO: 5 may be a nucleotide sequence having homology or identity of at least 80%, 90%, 95%, or 99% or higher with the nucleotide sequence of SEQ ID NO: 7. Additionally, the nucleotide sequence encoding the amino acid sequence represented by SEQ ID NO: 6 may be a nucleotide sequence having homology or identity of at least 80%, 90%, 95%, or 99% or higher with the nucleotide sequence of SEQ ID NO: 8, but is not limited thereto.

The SerC may be, for example, a protein having or including an amino acid sequence represented by SEQ ID NO: 9, or a protein consisting of or consisting essentially of an amino acid sequence represented by SEQ ID NO: 9, but is not limited thereto. Additionally, the SerC may have or include an amino acid sequence having homology or identity of at least 80%, 90%, 95%, or 99% or higher, and less than 100% with the amino acid sequence represented by SEQ ID NO: 9, as long as it shows the activity of SerC. Further, the SerC may consist or consist essentially of an amino acid sequence having homology or identity of at least 80%, 90%, 95%, or 99% or higher, and less than 100% with the amino acid sequence represented by SEQ ID NO: 9, as long as it shows the activity of SerC.

In addition, the polynucleotide encoding the SerC may have a nucleotide sequence encoding the amino acid sequence represented by SEQ ID NO: 9. The polynucleotide may undergo various modifications in the coding region within the scope that does not change the amino acid sequence of the polypeptide, due to codon degeneracy or in consideration of the codons preferred in an organism in which the polypeptide is to be expressed. The polynucleotide encoding the SerC may have or include, for example, a nucleotide sequence having homology or identity of 80%, 90%, 95%, or 99% or higher with the nucleotide sequence of SEQ ID NO: 10, but is not limited thereto. Moreover, the polynucleotide encoding the SerC may consist or consist essentially of a nucleotide sequence having homology or identity of 80%, 90%, 95%, or 99% or higher with the nucleotide sequence of SEQ ID NO: 10, but is not limited thereto.

As used herein, the term "enhancement compared to its endogenous activity" and the enhancement method are the same as described above.

Additionally, the microorganism may be a microorganism in which its capability to introduce OPS into a cell or decompose OPS is further weakened.

Regarding the contents of the OPS-producing microorganism, the disclosures in U.S. Pat. No. 8,557,549 B2 may be used as references of the present application, in addition to those described above.

In even another aspect of the present application, the present application provides a method for producing O-phosphoserine, including culturing an O-phosphoserine-producing microorganism, which includes any one or more of the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1, the polynucleotide encoding the polypeptide of the present application, and the vector containing the polynucleotide of the present application.

The SEQ ID NO: 11, SEQ ID NO: 1, O-phosphoserine, polypeptide having O-phosphoserine exporting activity, polynucleotide, vector, and microorganism are the same as described above.

As used herein, the term "cultivation" means that the microorganism is grown under appropriately controlled environmental conditions. The cultivation process of the present application may be performed in a suitable culture medium and culture conditions known in the art. Such a cultivation process may be easily adjusted for use by those skilled in the art according to the strain to be selected. Specifically, the cultivation may be a batch culture, a continuous culture, and a fed-batch culture, but is not limited thereto.

In culturing the recombinant microorganism having reduced SerB activity compared to its endogenous activity, the medium may further contain glycine or serine, as the serine requirement of the recombinant microorganism is induced. Glycine may be provided in the form of purified glycine, a glycine-containing yeast extract, or tryptone. The concentration of glycine to be contained in the medium is generally 0.1 g/L to 10 g/L, and specifically 0.5 g/L to 3 g/L. Additionally, serine may be provided in the form of purified serine, a serine-containing yeast extract, or tryptone. The concentration of serine to be contained in the medium is generally 0.1 g/L to 5 g/L, and specifically 0.1 g/L to 1 g/L.

Examples of the carbon source to be contained in the medium may include saccharides and carbohydrates such as glucose, sucrose, lactose, fructose, maltose, starch, and cellulose; oils and fats such as soybean oil, sunflower oil, castor oil, and coconut oil; fatty acids such as palmitic acid, stearic acid, and linoleic acid; alcohols such as glycerol and ethanol; and organic acids such as acetic acid. These carbon sources may be used alone or in combination, but are not limited thereto.

Examples of the nitrogen source to be contained in the medium may include organic nitrogen sources such as peptone, yeast extract, meat gravy, malt extract, corn steep liquor, and bean flour; and inorganic nitrogen sources such as urea, ammonium sulfate, ammonium chloride, ammonium phosphate, ammonium carbonate, and ammonium nitrate. These nitrogen sources may be used alone or in combination, but are not limited thereto.

Examples of the phosphorous source to be contained in the medium may include potassium dihydrogen phosphate, dipotassium hydrogen phosphate, and corresponding sodium-containing salts, but are not limited thereto.

Additionally, the culture media may include metal salts, such as magnesium sulfate or iron sulfate, and may further contain amino acids, vitamins, and appropriate precursors. These culture media or precursors may be added to the culture in the form of a batch culture or continuous culture, but are not limited thereto.

The pH of the culture may be adjusted by adding a compound such as ammonium hydroxide, potassium hydroxide, ammonia, phosphoric acid, and sulfuric acid during cultivation in an appropriate manner. Additionally, bubble formation may be prevented during the cultivation using an antifoaming agent such as a fatty acid polyglycol ester. Further, oxygen gas or a gas containing oxygen may be injected to the culture in order to maintain aerobic conditions of the culture; or nitrogen gas, hydrogen gas, or carbon dioxide may be injected to maintain anaerobic or microaerobic conditions, without the injection of gas. The temperature of the culture may be in the range of from 25° C. to 40° C., specifically from 30° C. to 35° C. The cultivation may be continued until the production of a desired material can be obtained, and specifically for from 10 hours to 100 hours, but is not limited to these illustrative examples.

The present application may further include a step of preparing a medium before the culturing step in the method of the present application, but is not limited thereto.

The present application may further include a step of recovering the OPS produced in the culturing step in the method of the present application after the culturing step. The intended OPS may be recovered from the culture by separation and purification using an appropriate method known in the art, according to the culture method, for example, a batch culture, a continuous culture, and a fed-batch culture, but is not limited thereto.

In further another aspect of the present application, the present application provides a method for producing cysteine or a derivative thereof, including:

a) producing O-phosphoserine (OPS) or a medium containing the same by culturing an O-phosphoserine-producing microorganism, which includes any one or more of the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1, the polynucleotide encoding the polypeptide of the present application, and the vector containing the polynucleotide of the present application, in a medium; and b) reacting the O-phosphoserine or a medium containing the same produced in step a) with a sulfide in the presence of O-phosphoserine sulfhydrylase (OPSS) or a microorganism expressing the same.

The SEQ ID NO: 11, SEQ ID NO: 1, O-phosphoserine, polypeptide having O-phosphoserine exporting activity, polynucleotide, vector, and microorganism are the same as described above.

As used herein, the term "derivative" refers to similar compounds obtained by chemically modifying a portion of any compound. The term usually refers to compounds in which a hydrogen atom or a particular atom group is substituted with another atom or atom group.

As used herein, the term "cysteine derivative" refers to compounds in which a hydrogen atom or a particular atom group in cysteine is substituted with another atom or atom group. For example, the cysteine derivatives may have a form in which the nitrogen atom of the amine group ($-NH_2$) or the sulfur atom of the thiol group ($-SH$) in cysteine has another atom or atom group attached thereto, and the examples of cysteine derivatives may include NAC (N-acetylcysteine), SCMC (S-carboxymethylcysteine), Boc-Cys(Me)-OH, (R)-S-(2-amino-2-carboxyethyl)-L-homocysteine, (R)-2-amino-3-sulfopropionic acid, D-2-amino-4-(ethylthio) butyric acid, 3-sulfino-L-alanine, Fmoc-Cys(Boc-methyl)-OH, seleno-L-cystine, S-(2-thiazolyl)-L-cysteine, S-(2-thienyl)-L-cysteine, S-(4-tolyl)-L-cysteine, etc., but are not limited thereto.

As long as cysteine is produced according to the method of the present application, conversion to cysteine derivatives can be easily converted into various cysteine derivatives by way of a method well known in the art.

Specifically, the method of producing the cysteine derivatives may further include converting the cysteine produced in step b) into a cysteine derivative. For example, cysteine may be synthesized into N-acetylcysteine (NAC) by way of a reaction with an acetylation agent, or it may be synthesized into S-carboxymethylcysteine (SCMC) by way of a reaction with a haloacetic acid in basic conditions, but is not limited thereto.

These cysteine derivatives are used mainly as pharmaceutical materials for antitussive agents, cough-relieving agents, and therapeutic agents for bronchitis, bronchial asthma, laryngopharyngitis, etc., but are not limited thereto.

As used herein, the term "O-phosphoserine sulfhydrylase (OPSS)" refers to an enzyme that catalyzes a reaction by which OPS from a thiol group is converted into cysteine. The enzyme may have been first found in *Aeropyrum pernix, Mycobacterium tuberculosis, Mycobacterium smegmatis,* and *Trichomonas vaginalis* (Mino K. and Ishikawa K., *FEBS Letters*, 551:133-138, 2003; Burns K. E. et al., *J. Am. Chem. Soc.*, 127:11602-11603, 2005). Additionally, the OPSS may include not only wild-type OPSS proteins, but also variant proteins that include deletion, substitution, or addition in part of the polynucleotide sequence encoding the OPSS which show activity that is equal to or higher than the biological activity of wild-type OPSS proteins, and may also include all of the OPSS proteins disclosed in U.S. Pat. No. 8,557,549 B2 and U.S. Pat. No. 9,127,324 B2 and variants thereof.

The sulfide to be used in the present application may be any sulfide provided not only in a solid form generally used in the art, but also in a liquid or gas form due to the difference in pH, pressure, and solubility, and thus can be converted to a thiol (SH) group in the form of, for example, sulfide ($S^{2-}$) or thiosulfate ($S_2O_3^{2-}$). Specifically, the sulfide may include $Na_2S$, NaSH, $H_2S$, $(NH_4)_2S$, and $Na_2S_2O_3$, which can provide a thiol group to OPS, but is not limited thereto. In the reaction, a single thiol group is provided to a single reactive OPS group to produce a single cysteine or a derivative thereof. In this reaction, a sulfide is specifically added in an amount of 0.1 to 3 molar equivalents, and specifically 1 to 2 molar equivalents based on the molar concentration of OPS, but is not limited thereto.

Further, the method of the present application may further include recovering the cysteine produced in the above reaction step. In particular, the desired cysteine may be recovered by way of separation and purification from the reaction solution using a suitable reaction known in the art.

In still further another aspect of the present application, the present application provides a use for the production of O-phosphoserine of the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1, cysteine or cysteine derivatives.

In still further another aspect, the present application provides a use for exporting O-phosphoserine of the polypeptide having O-phosphoserine exporting activity, including a) a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I), and having an amino acid sequence, wherein b) the amino acid at a position corresponding to 88 is phenylalanine and c) the amino acid at a position corresponding to 207 is lysine (K), or the polypeptide having O-phosphoserine exporting activity having the amino acid sequence of SEQ ID NO: 1, from microorganisms.

The SEQ ID NO: 11, SEQ ID NO: 1, O-phosphoserine, cysteine, cysteine derivative, and microorganism are the same as described above.

MODE FOR INVENTION

Hereinafter, the present application will be described in detail by way of Examples. However, these Examples are merely preferred Examples given for illustrative purposes, and thus, the scope of the present application is not intended to be limited to or by these Examples. Meanwhile, technical features which are not described herein can be sufficiently understood and easily carried out by those skilled in the art in the technical field of the present application or in a similar technical field.

Example 1: Preparation of YhhS Major Facilitator Superfamily (MFS) Transporter Variants In order to improve the activity of the O-phosphoserine (hereinafter, "OPS") exporter for the improvement of OPS exporting activity in an OPS-producing strain, variants were prepared for the YhhS major facilitator superfamily (MFS) transporter (SEQ ID NO: 11), an OPS exporter protein, and yhhS (SEQ ID NO: 12), a gene encoding the same. The detailed process is described hereinbelow.

First, a library of yhhS gene variants was constructed. To this end, a random mutagenesis PCR (JENA error-prone PCR) was performed using a gene-specific primer pair (SEQ ID NOS: 13 and 14) based on the genomic DNA of *Escherichia coli* K12_W3110 (ATCC27325) as a template. PCR was performed with denaturation at 94° C. for 5 minutes, followed by denaturation at 94° C. for 30 seconds, annealing at 55° C. for 30 seconds, and 20 cycles of polymerization at 72° C. for 1 minute, and then polymerization at 72° C. for 5 minutes. In order to insert the thus-prepared mutant gene fragments into the pCL1920 vector with the rhtB promoter, a pCL_PrhtB vector was first constructed. PCR was performed using a gene-specific primer pair (SEQ ID NOS: 16 and 17) in order to secure the rhtB promoter (SEQ ID NO: 15). PCR was performed with denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. The rhtB promoter fragment was inserted into the pCL1920 vector (GenBank® No. AB236930) cut with SacI and SmaI to obtain pCL_PrhtB. The pCL_PrhtB vector was cut with SmaI and PstI, and then the mutant gene fragments were cloned thereinto using an In-fusion Cloning Kit (Clontech Laboratories, Inc.). The cloning was performed at 50° C. for 60 minutes to thereby construct plasmid libraries of pCL PrhtB yhhS gene variants. Primer sequences used herein are shown in Table 1 below.

TABLE 1

| SEQ ID NO: | Primer | Vector |
|---|---|---|
| 13 | CACCGGGAGCCCGGGatgC CCGAACCCGTAGCCGA | pCL_PrhtB-yhhS library |
| 14 | CTTGCATGCCTGCAGttaA GATGATGAGGCGGCCT | |
| 16 | CGGGGATCCTCTAGACGCT TGCTGCAACTCTCTCA | pCL_PrhtB |
| 17 | TACGGGTTCGGGcatGATA TCTTTCCTGTGTGAAA | |

The thus-constructed recombinant plasmid libraries were screened via high-throughput screening (HTS). In particular, the platform strain used for screening was CA07-0012 (KCCM11121P, U.S. Pat. No. 8,557,549 B2), which is a strain in which the activity of endogenous phosphoserine phosphatase (SerB) is weakened based on the wild-type *E. coli* strain W3110.

Subsequently, in order to obtain variants with improved OPS exporting activity, the thus-constructed pCL_PrhtB-yhhS gene variant plasmid libraries were transformed into the platform strain CA07-0012 via electroporation, and then cultured in media containing an excess amount of OPS, and three colonies where the growth inhibition was released were selected. Then, plasmids were obtained from the three selected colonies and analyzed via sequencing technology.

From the above, three yhhS gene variants which are involved in the release of growth inhibition under the excess OPS-added condition were selected, and a variant superior to yhhS M45 (US 2019-0233859 A1), which is an existing yhhS gene variant with increased OPS exporting activity, was obtained, and named yhhS453.

Upon analysis of the amino acid sequence of the polypeptide encoded by yhhS453, it was confirmed that YhhS453 has an amino acid sequence of SEQ ID NO: 1.

Example 2: Confirmation of OPS Exporting Activity of yhhS Gene Variant yhhS453

2-1. Construction of Strain Introduced with yhhS453 Using OPS-Producing Strain and Evaluation of OPS Producing Capability The one type of plasmid variant plasmid pCL_PrhtB-yhhS453 identified in Example 1 was transformed into CA07-0012, the OPS-producing strain, by electroporation conventionally used in the art. As such, CA07-0012/pCL__PrhtB-yhhS453, an OPS-producing strain introduced with the yhhS gene variants yhhS453 was constructed, and the OPS producing capability thereof was evaluated.

Specifically, each of the strains was plated out on a solid LB medium and cultured in a 33° C. incubator overnight. The strains cultured in the solid LB medium overnight were inoculated into a 25 mL titer medium shown in Table 2 below and then cultured in a 33° C. incubator at a rate of 200 rpm for 48 hours. The results are shown in Table 3 below.

TABLE 2

| Medium Component | Amount |
|---|---|
| Glucose | 40 g |
| $KH_2PO_4$ (KP1) | 6 g |
| $(NH_4)_2SO_4$ | 17 g |
| $MgSO_4 \cdot 7H_2O$ | 1 g |
| $MnSO_4 \cdot 4H_2O$ | 5 mg |
| $FeSO_4 \cdot 7H_2O$ | 10 mg |
| L-Glycine | 2.5 g/L |
| Yeast Extract | 3 g/L |
| $CaCO_3$ | 30 g/L |
| PH | 6.8 |

TABLE 3

| Name of Strains | $OD_{562\ nm}$ | Glucose Consumption (g/L) | O-Phosphoserine (g/L) |
|---|---|---|---|
| CA07-0012/pCL1920 | 45 | 40 | 1.4 |
| CA07-0012/pCL_PrhtB-yhhS | 42.7 | 40 | 1.7 |
| CA07-0012/pCL_PrhtB-yhhSM45 | 32 | 40 | 2.3 |
| CA07-0012/pCL_PrhtB-yhhS453 | 30 | 40 | 3.1 |

As shown in Table 3, in the case of the strain introduced with the yhhS gene variant of the present application, it was confirmed that the amount of OPS production was increased compared to the strain introduced with the wild-type yhhS gene. Additionally, it was confirmed that the amount of OPS production was increased compared to yhhS M45, which is the platform yhhS gene variant. Specifically, yhhS453 showed that the OPS concentration was increased by 82% as compared to the wild-type yhhS and by 35% as compared to the yhhS M45, the platform yhhS gene variant.

The CA07-0012/pCL_PrhtB-yhhS453 was named *Escherichia coli* CA07-0352, and the CA07-0352 strain was deposited at the Korean Culture Center of Microorganisms (KCCM) under the Budapest Treaty on May 14, 2020, with Accession No. KCCM12720P.

2-2. Construction of Strain Introduced with yhhS453 Using Strains with Enhanced SerA and SerC and Evaluation of OPS Producing Capability In order to reconfirm the activity of yhhS453, CA07-0022/pCL-Prmf-serA*(G336V)-serC (KCCM11103P, U.S. Pat. No. 8,557,549 B2), which, as an OPS-producing strain with improved OPS producing capability, has enhanced activity of D-3-phosphoglycerate dehydrogenase (SerA) and 3-phosphoserine aminotransferase (SerC) as OPS biosynthesis pathways, was used.

yhhS453 was cloned into the HindIII restriction enzyme site of the pCL_Prmf-serA*(G336V)-serC vector. First, PCR was performed using a primer pair of SEQ ID NOS: 18 and 19 based on pCL_PrhtB-yhhS453 as a template to obtain a yhhS453 gene fragment. PCR was performed with denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. The yhhS453 gene fragment obtained through the PCR was cloned using an infusion cloning kit. The cloning was performed at 50° C. for 60 minutes to thereby construct pCL_Prmf-serA*(G336V)-(RBS)serC_PrhtB-yhhS453 variant plasmid. As a control, CA07-0022/pCL_Prmf-serA*(G336V)-(RBS)serC_PrhtB-yhhS M25 and CA07-0022/pCL_Prmf-serA*(G336V)-(RBS)serC_PrhtB-yhhS M45 were used (US 2019-0233859 A1). Primer sequences used herein are shown in Table 4 below.

TABLE 4

| SEQ ID NO: | Primers | Vector |
| --- | --- | --- |
| 18 | CACGGTTAAAAGCTTCGA TGGTCGATGATTAAGAC | pCL_Prmf-serA* (G336V)-(RBS) serC_PrhtB- yhhS453 |
| 19 | GATTACGCCAAGCTTtta AGATGATGAGGCGGCCT | |

The each of the thus-constructed plasmids was transformed into CA07-0012, an OPS-producing strain, by electroporation conventionally used in the art. As such, CA07-0022/pCL_Prmf-serA*(G336V)-(RBS)serC_PrhtB-yhhS453, an OPS-producing strain introduced with the yhhS gene variant yhhS453, was constructed, and the OPS producing capability thereof was evaluated.

Specifically, each of the strains was plated out on a solid LB medium and then cultured in a 33° C. incubator overnight. The strains cultured in the solid LB medium overnight were inoculated into a 25 mL titer medium shown in Table 1 above and then cultured in a 33° C. incubator at a rate of 200 rpm for 48 hours. The results are shown in Table 5 below.

TABLE 5

| Name of Strain | $OD_{562\,nm}$ | Glucose Consumption (g/L) | O-Phosphoserine (g/L) |
| --- | --- | --- | --- |
| CA07-0022/pCL_Prmf-serA* (G336V)-(RBS)serC_ PrhtB-yhhS(wt) | 30 | 40 | 4.01 |
| CA07-0022/pCL_Prmf-serA* (G336V)-(RBS)serC_ PrhtB-yhhS M25 | 26.3 | 40 | 6.01 |
| CA07-0022/pCL_Prmf-serA* (G336V)-(RBS)serC_ PrhtB-yhhS M45 | 25.4 | 40 | 4.8 |
| CA07-0022/pCL_Prmf-serA* (G336V)-(RBS)serC_ PrhtB-yhhS453 | 25.1 | 40 | 7.5 |

As shown in Table 5, when the yhhS453 of the present application was introduced into an OPS-producing strain in which the gene of the OPS biosynthetic pathway was enhanced, it was confirmed that the amount of OPS production could be improved. This result suggests that yhhS453 of the present application can be effectively used in OPS production.

The CA07-0022/pCL_Prmf-serA*(G336V)-(RBS)serC_PrhtB-yhhS453 was named *Escherichia coli* CA07-0353, and CA07-0353 strain was deposited at the Korean Culture Center of Microorganisms (KCCM) under the Budapest Treaty on May 14, 2020, with Accession No. KCCM12721P.

2-3. Construction of Strain Introduced with yhhS453 According to Promoter Strength on the Chromosome and Evaluation of OPS Producing Capability In order to confirm whether the OPS exporting activity was improved when the yhhS453 was introduced on the chromosome, the autologous promoter of the microorganism was substituted with the trc promoter, and a strain introduced with yhhS453 of the present application was constructed and its OPS producing capability evaluated. Specifically, the pSKH130 vector (SEQ ID NO: 30) was used to insert the trc promoter into the chromosome of *E. coli*. The vector contained a PI protein (pir gene)-dependent R6K replicon, SacB (Levansucrase) gene, and kanamycin resistance gene.

After obtaining the desired strain using R6K and kanamycin at the first crossover using the vector, the antibiotics were removed from the medium containing sucrose to prepare a strain. Specifically, a pSKH130_yhhS453 vector was constructed to replace autologous yhhS in CA07-0022 strain with yhhS453. In order to construct pSKH130-yhhS453, PCR was performed using a primer pair of SEQ ID NOS: 20 and 21 based on the pCL_PrhtB-yhhS453 obtained in Example 1 as a template to obtain a yhhS453 gene fragment. PCR was performed with denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. The amplified gene fragment was cloned using the pSKH130 vector treated with the restriction enzyme EcoRV and an in-fusion cloning kit (Clontech Laboratories, Inc.) to obtain pSK-yhhS453. The obtained plasmid was transformed into CA7-0022 strain by electroporation. In the transformed strain, the strain introduced into the chromosome in the LB solid medium containing kanamycin was selected by recombination (crossover), and then the plasmid site was cut from the chromosome through secondary recombination (replacement) in the medium containing sucrose. After completion of the secondary recombination, the strain was subjected to PCR using a primer pair of SEQ ID NOS: 22 and 23 and sequence analysis to construct CA07-0022::yhhS453 strain.

PSKH130-Ptrc-yhhS453' was constructed to enhance the promoter of yhhS453 in the thus-constructed CA07-0022::yhhS453 strain. Specifically, PCR was performed using a primer pair of SEQ ID NOS: 24 and 25 based on the E. coli wild-type W3110 strain as a template to obtain a yhhSUP DNA fragment. The PCR was performed by denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. Subsequently, PCR was performed using a primer pair of SEQ ID NOS: 26 and 27 based on the pCL_Ptrc-gfp (US 2017-0247727 A1) as a template to obtain a DNA fragment of Ptrc. The PCR was performed by denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. Further, PCR was performed using a primer pair of SEQ ID NOS: 28 and 29 based on the pCL_PrhtB-yhhS453 as a template to obtain a yhhS453 fragment. PCR was performed with denaturation at 94° C. for 5 minutes, followed by 30 cycles of denaturation at 94° C. for 30 seconds, annealing at 55° C. for 30 seconds, and polymerization at 72° C. for 1 minute, and then polymerization at 72° C. for 5 minutes. The amplified gene fragments were cloned using the pSKH130 vector treated with the restriction enzyme EcoRV and IST to obtain pSKH_yhhSUP_Ptrc-yhhS453. The obtained plasmid was transformed into CA7-0022::yhhS453 strain by electroporation. In the transformed strain, the strain introduced into the chromosome in the LB solid medium containing kanamycin was selected by recombination (crossover), and then the plasmid site was cut from the chromosome through secondary recombination (replacement) in the medium containing sucrose. After completion of the secondary recombination, the strain was confirmed using a pair of primers of SEQ ID NOS: 22 and 23. The constructed strain was named CA07-0022::Ptrc-yhhS453. Primer sequences used herein are shown in Table 6 below.

TABLE 6

| SEQ ID NO: | Primer | Vector |
|---|---|---|
| 20 | CAGGAATTCGATATCATG CCCGAACCCGTAGCCGA | pSK-yhhS453 |
| 21 | GACTAGCGTGATATCTTA AGATGATGAGGCGGCCT | |
| 22 | ATGTGAATCTGTGGATTATT | yhhS-out |
| 23 | GTTATGGCCGTTTATCGAAA | |
| 24 | CAGGAATTCGATATCTCGCT CCGGCGACATATGCA | pSKH130-Ptrc-yhhS453' |
| 25 | CAGCAAGCGGGTACCGAGGA TCACCACATTTTTAC | |
| 26 | AATGTGGTGATCCTCGGTAC CCGCTTGCTGCAACT | |
| 27 | TACGGGTTCGGGCATGATAT CTTTCCTGTGTGAAA | |
| 28 | CACAGGAAAGATATCATGCC CGAACCCGTAGCCGA | |

TABLE 6-continued

| SEQ ID NO: | Primer | Vector |
|---|---|---|
| 29 | GACTAGCGTGATATCGCACC CATCGCCATCGCCCC | |

As a control group, CA07-0022::Ptrc-yhhS, CA07-0022::Ptrc-yhhS M25, and CA07-0022::Ptrc-yhhS M45 constructed in the same manner above were used. The nucleotide sequences of the primers used for PCR were the same as above. The thus-constructed strain was transformed by introducing a vector pCL_Prmf-serA*(G336V)-(RBS)serC enhanced with serA and serC by electroporation commonly used in the art to confirm the OPS producing capability.

Each of the strains was plated out on a solid LB medium and then cultured in a 33° C. incubator overnight. The strains cultured in the LB solid medium overnight were inoculated into a 25 mL titer medium shown in Table 1 above and then cultured in a 33° C. incubator at a rate of 200 rpm for 48 hours. The results are shown in Table 7 below.

TABLE 7

| Name of Strain | OD$_{562\ nm}$ | Glucose Consumption (g/L) | O-Phosphoserine (g/L) |
|---|---|---|---|
| CA07-0022/pCL_Prmf-serA*(G336V)-(RBS)serC | 32 | 40 | 1.7 |
| CA07-0022::Ptrc-yhhS/pCL_Prmf-serA*(G336V)-(RBS)serC | 33 | 40 | 2.0 |
| CA07-0022::Ptrc-yhhS M25/pCL_Prmf-serA*(G336V)-(RBS)serC | 35 | 40 | 3.2 |
| CA07-0022::Ptrc-yhhS M45/pCL_Prmf-serA*(G336V)-(RBS)serC | 25.4 | 40 | 2.7 |
| CA07-0022::Ptrc-yhhS453/pCL_Prmf-serA*(G336V)-(RBS)serC | 25.1 | 40 | 5.0 |

As shown in Table 7 above, when the activity of yhhS453 was increased by enhancing the promoter on the chromosome, it was confirmed that the amount of OPS production was increased more than twice as compared to the wild-type yhhS-introduced strain, and it was also confirmed that the OPS concentration was significantly increased compared to other yhhS gene variants M45 and M25.

Those of ordinary skill in the art will recognize that the present application may be embodied in other specific forms without departing from its spirit or essential characteristics. The described embodiments are to be considered in all respects only as illustrative and not restrictive. The scope of the present application is therefore indicated by the appended claims rather than by the foregoing description. All changes which come within the meaning and range of equivalency of the claims are to be embraced within the scope of the present application.

The invention claimed is:

1. A polypeptide having O-phosphoserine (OPS) exporting activity, comprising an amino acid sequence having at least 95% or higher sequence identity to the amino acid sequence of SEQ ID NO: 11, wherein
  a) the polypeptide comprises a substitution of isoleucine (I) at a position corresponding to 241 in the amino acid sequence of SEQ ID NO: 11 with threonine (T), a substitution of aspartic acid (D) at a position corresponding to 246 in the amino acid sequence of SEQ ID NO: 11 with valine (V), and a substitution of valine (V) at a position corresponding to 330 in the amino acid sequence of SEQ ID NO: 11 with isoleucine (I),
  b) the amino acid at a position corresponding to 88 in the amino acid sequence of SEQ ID NO: 11 is phenylalanine, and
  c) the amino acid at a position corresponding to 207 in the amino acid sequence of SEQ ID NO: 11 is lysine (K).

2. The polypeptide of claim 1, wherein the polypeptide comprises an amino acid sequence of SEQ ID NO: 1, wherein SEQ ID NO: 1 is the amino acid sequence of SEQ ID NO: 11 with:
  a) the substitution of isoleucine (I) at a position corresponding to 241 in the amino acid sequence of SEQ ID NO: 11 with threonine (T), the substitution of aspartic acid (D) at a position corresponding to 246 in the amino acid sequence of SEQ ID NO: 11 with valine (V), and the substitution of valine (V) at a position corresponding to 330 in the amino acid sequence of SEQ ID NO: 11 with isoleucine (I),
  b) the amino acid at a position corresponding to 88 in the amino acid sequence of SEQ ID NO: 11 is phenylalanine, and
  c) the amino acid at a position corresponding to 207 in the amino acid sequence of SEQ ID NO: 11 is lysine (K).

3. A polynucleotide encoding the polypeptide of claim 1.

4. An O-phosphoserine-producing microorganism, comprising any one or more selected from the group consisting of (i) the polypeptide of claim 1, (ii) a polynucleotide encoding the polypeptide, and (iii) a vector containing the polynucleotide.

5. The microorganism of claim 4, in which the activity of a phosphoserine phosphatase (SerB) is further weakened compared to that of wild-type microorganism.

6. The microorganism of claim 4, in which the activity of a phosphoglycerate dehydrogenase (SerA) or a phosphoserine aminotransferase (SerC) is further enhanced compared to that of wild-type microorganism.

7. The microorganism of claim 4, wherein the microorganism is *Escherichia coli*.

8. A method for producing O-phosphoserine, comprising culturing an O-phosphoserine-producing microorganism, which comprises any one or more selected from the group consisting of (i) the polypeptide of claim 1, (ii) a polynucleotide encoding the polypeptide, and (iii) a vector containing the polynucleotide, in a medium.

9. The method of claim 8, wherein the method further comprises recovering O-phosphoserine from the cultured medium or the microorganism.

10. A method for producing cysteine or a derivative thereof, comprising:
  a) producing O-phosphoserine (OPS) or producing a medium comprising O-phosphoserine by culturing an O-phosphoserine-producing microorganism, which comprises any one or more selected from the group consisting of the (i) polypeptide of claim 1, (ii) a polynucleotide encoding the polypeptide, and (iii) a vector containing the polynucleotide, in a medium; and
  b) reacting the O-phosphoserine or reacting the medium comprising O-phosphoserine produced with a sulfide, in the presence of O-phosphoserine sulfhydrylase (OPSS) or a microorganism expressing the same.

11. The method of claim 10, wherein the method further comprises converting the cysteine produced in b) into a cysteine derivative.

12. The method of claim 10, wherein the sulfide is at least one selected from the group consisting of $Na_2S$, NaSH, $(NH_4)_2S$, $H_2S$, and $Na_2S_2O_3$.

* * * * *